United States Patent
Munro et al.

(10) Patent No.: US 8,235,556 B2
(45) Date of Patent: Aug. 7, 2012

(54) CONDENSING ELEMENT, ARRAY, AND METHODS THEREOF

(75) Inventors: James F. Munro, Walworth, NY (US); Penny J. Munro, Walworth, NY (US)

(73) Assignee: Reflexite Corporation, Avon, CT (US)

( * ) Notice: Subject to any disclaimer, the term of this patent is extended or adjusted under 35 U.S.C. 154(b) by 324 days.

(21) Appl. No.: 12/254,445

(22) Filed: Oct. 20, 2008

(65) Prior Publication Data

US 2010/0097809 A1 Apr. 22, 2010

(51) Int. Cl.
*F21V 13/04* (2006.01)
*F21V 5/00* (2006.01)

(52) U.S. Cl. .................. 362/327; 362/245; 362/335

(58) Field of Classification Search .......... 362/327, 362/245, 555, 326, 335, 336; 359/627, 709–712, 359/726–729

See application file for complete search history.

(56) References Cited

U.S. PATENT DOCUMENTS

| | | | |
|---|---|---|---|
| 2,254,962 A * | 9/1941 | Bitner et al. .............. | 362/327 |
| 4,698,730 A | 10/1987 | Sakai et al. | |
| 4,767,172 A | 8/1988 | Nichols et al. | |
| 4,770,514 A * | 9/1988 | Silverglate ............... | 359/728 |
| 5,485,317 A | 1/1996 | Perissinotto | |
| 5,526,190 A | 6/1996 | Hubble, III et al. | |
| 5,577,492 A | 11/1996 | Parkyn, Jr. et al. | |
| 5,704,709 A | 1/1998 | Zwick et al. | |
| 5,757,557 A | 5/1998 | Medvedev et al. | |
| 5,884,995 A * | 3/1999 | Perlo et al. ............... | 362/327 |
| 5,894,195 A | 4/1999 | McDermott | |
| 5,894,196 A | 4/1999 | McDermott | |
| 5,898,267 A | 4/1999 | McDermott | |
| 5,939,996 A | 8/1999 | Kniveton et al. | |
| 6,536,923 B1 | 3/2003 | Merz | |
| 6,552,368 B2 | 4/2003 | Tamai et al. | |
| 6,724,543 B1 | 4/2004 | Chinniah et al. | |
| 6,811,277 B2 | 11/2004 | Amano | |
| 6,819,506 B1 | 11/2004 | Taylor et al. | |
| 6,896,381 B2 | 5/2005 | Benitez et al. | |
| 6,951,415 B2 | 10/2005 | Amano et al. | |
| 6,957,901 B2 | 10/2005 | Schach et al. | |
| 7,118,236 B2 | 10/2006 | Hahm et al. | |
| 7,152,985 B2 | 12/2006 | Benitez et al. | |
| 7,181,378 B2 | 2/2007 | Benitez et al. | |
| 7,224,537 B2 * | 5/2007 | Choi ......................... | 359/707 |

(Continued)

FOREIGN PATENT DOCUMENTS

EP 1 434 277 A1 6/2004

(Continued)

*Primary Examiner* — Alan Cariaso
(74) *Attorney, Agent, or Firm* — LeClairRyan, a Professional Corporation

(57) ABSTRACT

A condensing element, array, and methods thereof include a bowl-shaped outer section and a lens-shaped inner section. The outer section provides substantially total internal reflection of light entering at an input surface of the outer section. The inner section is recessed within the outer section at a distance from the entering light that is within the focal position of the inner section. The outer and inner sections are configured in a preferred embodiment so that substantially all the light exiting the condensing element is substantially parallel to the optical axis of the entering light. In an alternate embodiment, the configuration of the condensing element can be modified to selectively adjust the desired degree of collimation of the exiting light.

58 Claims, 28 Drawing Sheets

U.S. PATENT DOCUMENTS

| | | |
|---|---|---|
| 7,244,924 B2 | 7/2007 | Kiyomoto et al. |
| 7,281,820 B2 * | 10/2007 | Bayat et al. .................... 362/245 |
| 7,411,742 B1 * | 8/2008 | Kim et al. ..................... 359/718 |
| 7,431,480 B2 | 10/2008 | Godo |
| 7,465,075 B2 * | 12/2008 | Chinniah et al. .............. 362/336 |
| 7,473,013 B2 * | 1/2009 | Shimada ....................... 362/327 |

FOREIGN PATENT DOCUMENTS

| | | |
|---|---|---|
| JP | 2006-243603 A | 9/2006 |
| WO | 2007/081719 A2 | 7/2007 |

* cited by examiner

| Rho (mm) | Height (mm) | Theta-i (degs) | Slope (Th-S, degs) |
|---|---|---|---|
| 1.000 | 0.00000 | 0.00 | 45.00 |
| 1.050 | 0.05000 | 2.73 | 46.36 |
| 1.100 | 0.10244 | 5.32 | 47.66 |
| 1.150 | 0.15731 | 7.79 | 48.89 |
| 1.200 | 0.21462 | 10.14 | 50.07 |
| 1.250 | 0.27435 | 12.38 | 51.19 |
| 1.300 | 0.33652 | 14.51 | 52.26 |
| 1.350 | 0.40111 | 16.55 | 53.27 |
| 1.400 | 0.46812 | 18.49 | 54.24 |
| 1.450 | 0.53756 | 20.34 | 55.17 |
| 1.500 | 0.60942 | 22.11 | 56.06 |
| 1.550 | 0.68371 | 23.80 | 56.90 |
| 1.600 | 0.76041 | 25.42 | 57.71 |
| 1.650 | 0.83953 | 26.97 | 58.48 |
| 1.700 | 0.92107 | 28.45 | 59.22 |
| 1.750 | 1.00503 | 29.87 | 59.93 |
| 1.800 | 1.09141 | 31.23 | 60.61 |
| 1.850 | 1.18020 | 32.54 | 61.27 |
| 1.900 | 1.27140 | 33.79 | 61.89 |
| 1.950 | 1.36502 | 34.99 | 62.50 |
| 2.000 | 1.46105 | 36.15 | 63.07 |
| 2.050 | 1.55950 | 37.26 | 63.63 |
| 2.100 | 1.66036 | 38.33 | 64.17 |
| 2.150 | 1.76363 | 39.36 | 64.68 |
| 2.200 | 1.86932 | 40.35 | 65.18 |
| 2.250 | 1.97741 | 41.31 | 65.66 |
| 2.300 | 2.08792 | 42.23 | 66.12 |
| 2.350 | 2.20084 | 43.12 | 66.56 |
| 2.400 | 2.31617 | 43.98 | 66.99 |
| 2.450 | 2.43391 | 44.81 | 67.41 |
| 2.500 | 2.55406 | 45.61 | 67.81 |
| 2.550 | 2.67662 | 46.39 | 68.19 |
| 2.600 | 2.80159 | 47.14 | 68.57 |
| 2.650 | 2.92897 | 47.86 | 68.93 |
| 2.700 | 3.05876 | 48.56 | 69.28 |
| 2.750 | 3.19096 | 49.24 | 69.62 |
| 2.800 | 3.32557 | 49.90 | 69.95 |
| 2.850 | 3.46258 | 50.54 | 70.27 |
| 2.900 | 3.60201 | 51.16 | 70.58 |
| 2.950 | 3.74384 | 51.76 | 70.88 |
| 3.000 | 3.88808 | 52.35 | 71.17 |

FIGURE 4

| θe | Solid Angle Subtended by 2θe | Solid Angle Beyond θe | % of Hemisphere Beyond θe | Source Emission Beyond θe | Approx % of Light Emitted Beyond θe |
|---|---|---|---|---|---|
| 0 | 0.0000 | 6.2832 | 100.00% | 100.00% | 100.00% |
| 2 | 0.0038 | 6.2794 | 99.94% | 96.51% | 96.45% |
| 4 | 0.0153 | 6.2679 | 99.76% | 93.02% | 92.80% |
| 6 | 0.0344 | 6.2488 | 99.45% | 89.55% | 89.06% |
| 8 | 0.0611 | 6.2220 | 99.03% | 86.08% | 85.24% |
| 10 | 0.0955 | 6.1877 | 98.48% | 82.64% | 81.38% |
| 12 | 0.1373 | 6.1459 | 97.81% | 79.21% | 77.48% |
| 14 | 0.1866 | 6.0965 | 97.03% | 75.81% | 73.56% |
| 16 | 0.2434 | 6.0398 | 96.13% | 72.44% | 69.63% |
| 18 | 0.3075 | 5.9757 | 95.11% | 69.10% | 65.72% |
| 20 | 0.3789 | 5.9043 | 93.97% | 65.80% | 61.83% |
| 22 | 0.4575 | 5.8257 | 92.72% | 62.54% | 57.99% |
| 24 | 0.5432 | 5.7400 | 91.35% | 59.33% | 54.20% |
| 26 | 0.6359 | 5.6473 | 89.88% | 56.16% | 50.48% |
| 28 | 0.7355 | 5.5477 | 88.29% | 53.05% | 46.84% |
| 30 | 0.8418 | 5.4414 | 86.60% | 50.00% | 43.30% |
| 32 | 0.9547 | 5.3284 | 84.80% | 47.01% | 39.87% |
| 34 | 1.0742 | 5.2090 | 82.90% | 44.08% | 36.54% |
| 36 | 1.2000 | 5.0832 | 80.90% | 41.22% | 33.35% |
| 38 | 1.3320 | 4.9512 | 78.80% | 38.43% | 30.29% |
| 40 | 1.4700 | 4.8132 | 76.60% | 35.72% | 27.36% |
| 42 | 1.6139 | 4.6693 | 74.31% | 33.09% | 24.59% |
| 44 | 1.7634 | 4.5197 | 71.93% | 30.53% | 21.96% |
| 46 | 1.9185 | 4.3647 | 69.47% | 28.07% | 19.50% |
| 48 | 2.0789 | 4.2043 | 66.91% | 25.69% | 17.19% |
| 50 | 2.2444 | 4.0388 | 64.28% | 23.40% | 15.04% |
| 52 | 2.4149 | 3.8683 | 61.57% | 21.20% | 13.05% |
| 54 | 2.5900 | 3.6932 | 58.78% | 19.10% | 11.23% |
| 56 | 2.7697 | 3.5135 | 55.92% | 17.10% | 9.56% |
| 58 | 2.9536 | 3.3296 | 52.99% | 15.20% | 8.05% |
| 60 | 3.1416 | 3.1416 | 50.00% | 13.40% | 6.70% |
| 62 | 3.3334 | 2.9498 | 46.95% | 11.71% | 5.50% |
| 64 | 3.5288 | 2.7544 | 43.84% | 10.12% | 4.44% |
| 66 | 3.7276 | 2.5556 | 40.67% | 8.65% | 3.52% |
| 68 | 3.9295 | 2.3537 | 37.46% | 7.28% | 2.73% |
| 70 | 4.1342 | 2.1490 | 34.20% | 6.03% | 2.06% |
| 72 | 4.3416 | 1.9416 | 30.90% | 4.89% | 1.51% |
| 74 | 4.5513 | 1.7319 | 27.56% | 3.87% | 1.07% |
| 76 | 4.7631 | 1.5200 | 24.19% | 2.97% | 0.72% |
| 78 | 4.9768 | 1.3063 | 20.79% | 2.19% | 0.45% |
| 80 | 5.1921 | 1.0911 | 17.36% | 1.52% | 0.26% |
| 82 | 5.4087 | 0.8745 | 13.92% | 0.97% | 0.14% |
| 84 | 5.6264 | 0.6568 | 10.45% | 0.55% | 0.06% |
| 86 | 5.8449 | 0.4383 | 6.98% | 0.24% | 0.02% |
| 88 | 6.0639 | 0.2193 | 3.49% | 0.06% | 0.00% |
| 90 | 6.2832 | 0.0000 | 0.00% | 0.00% | 0.00% |

FIGURE 25

CONDENSING ELEMENT, ARRAY, AND METHODS THEREOF

FIELD OF THE INVENTION

This invention generally relates to a condensing element and, more particularly, to a monolithic, compact condensing element including a totally internally reflecting outer section and a lens-shaped inner section, condensing element arrays, and methods thereof

BACKGROUND

Typically, a light emitting diode (LED) emits light into a full hemisphere. For some applications, such as for display lighting or general room lighting, such an output can be desirable. However, for other applications, such as for a flashlight or a vehicular headlight, a more focused output is required.

To provide a narrower output light distribution angle, the light output from the LED often is condensed. A variety of devices have been developed to condense light from an LED, such as devices that utilize a parabolic reflector. Unfortunately, these prior devices have a number of drawbacks including being expensive to produce, physically large, inefficient, and unable to condense all of the light into a narrow output emission profile.

An alternate prior art method of condensing light from a source is shown in FIG. 1. This prior-art optical element has an input surface 4, onto which source 14 is located, an outer TIRing surface 1, and a lens-shaped output surface 2 through which all the light must exit. Light rays, such as 6 and 7, that propagate directly from the source 14 to the output surface 2 exit the output surface 2 in a direction that is substantially parallel to the optical axis A-A of the condensing element. The prescription of the lens-shaped output surface 2 is designed for this purpose.

Unfortunately not all of the light that exits the source 14 is directly incident onto the output surface 2. For example, light ray 8 exits the source 14 at a highly divergent angle and becomes incident on the outer surface 1. Light ray 8 then undergoes TIR at the outer surface 1, and then is incident on the output surface 2. Light ray 8 then refracts and exits through outer surface 2, and is directed in a direction that is not substantially parallel to the optical axis A-A. Light ray 8 therefore is not well condensed, and detracts from the overall performance of the condensing optical element. In this way, most prior art condensing optical elements suffer from poor light-condensing efficiency.

SUMMARY

A preferred embodiment includes a condensing element having a bowl-shaped outer section having a sidewall between a light input surface at one end and a light output surface at the other end and providing substantially total internal reflection of light emitted from the input surface and incident upon the sidewall of the outer section; and a lens-shaped inner section that is recessed within the outer section and having a sidewall extending to the output surface of the outer section, wherein light emitted from the light input surface is not directly incident upon the output surface. Light emitted from the light input surface and passing through the inner section is not incident on the output surface.

A method for making a condensing element in accordance with an embodiment of the present invention includes forming a bowl-shaped outer section having a sidewall between a light input surface at one end and a light output surface at the other end and providing substantially total internal reflection of light emitted from the input surface incident upon the sidewall of the outer section and; recessing within the outer section, a lens-shaped inner section having a sidewall extending to the output surface of the outer section, at a distance from the entering light that is within the focal position of the inner section, such that light emitted from the input surface is not incident on the output surface. Light emitted from the input surface and passing through the inner section is not incident on the output surface.

Accordingly, the present invention provides a condensing element that may be optically coupled to one or more LED sources to provide low-loss light concentration. Additionally, the present invention provides a condensing element that is easy and inexpensive to manufacture and which has a compact design, and condenses substantially all of the light entering the base of the outer section.

BRIEF DESCRIPTION OF THE DRAWINGS

FIG. 4 is a spreadsheet of examples of coordinates for the profiles of a TIRing outer section in accordance with an exemplary embodiment of the present invention;

FIG. 25 is a table of light emissions and collection efficiencies in accordance with an exemplary embodiment of the present invention.

DETAILED DESCRIPTION

A condensing element in accordance with an embodiment of the present invention includes an outer section and an inner section. The outer section has a light input surface and a light output surface. The outer section provides substantially total internal reflection (TIR) of light entering from the light input surface of the condensing element. TIR means that substantially none of the entering light is absorbed by the material at the surface or leaked from the condensing element. The prescription of the outer section is designed such that the light incident upon the outer section sidewall is totally internally reflected substantially parallel to the optical axis of the entering light. The inner section is lens-shaped and recessed within the outer section. Preferably, the inner section is a refractive lens. The prescription of the lens-shaped inner section is designed so that the inner section is placed in relation to the light source at the focal position of the inner section, and the light that exits from the lens-shaped inner section is substantially parallel to the optical axis. The placement of the inner recessed lens is such that it blocks light from the source from directly reaching the output surface of the outer section. Light emitted from the input surface and passing through the inner section is not incident on the output surface.

Figure 1:
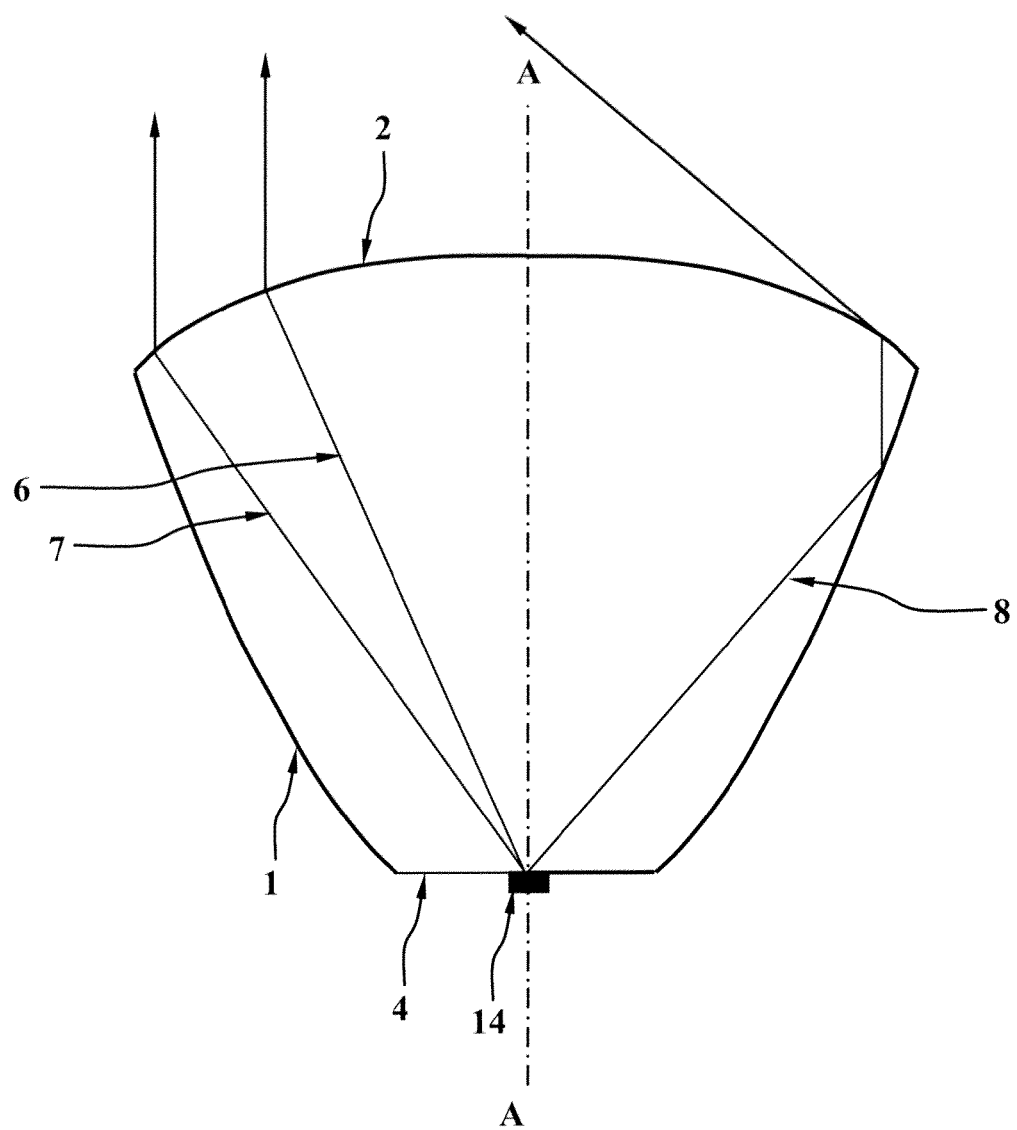
FIG. 1 is a cross-sectional view of a condensing element found in the prior art.
Figure 2:
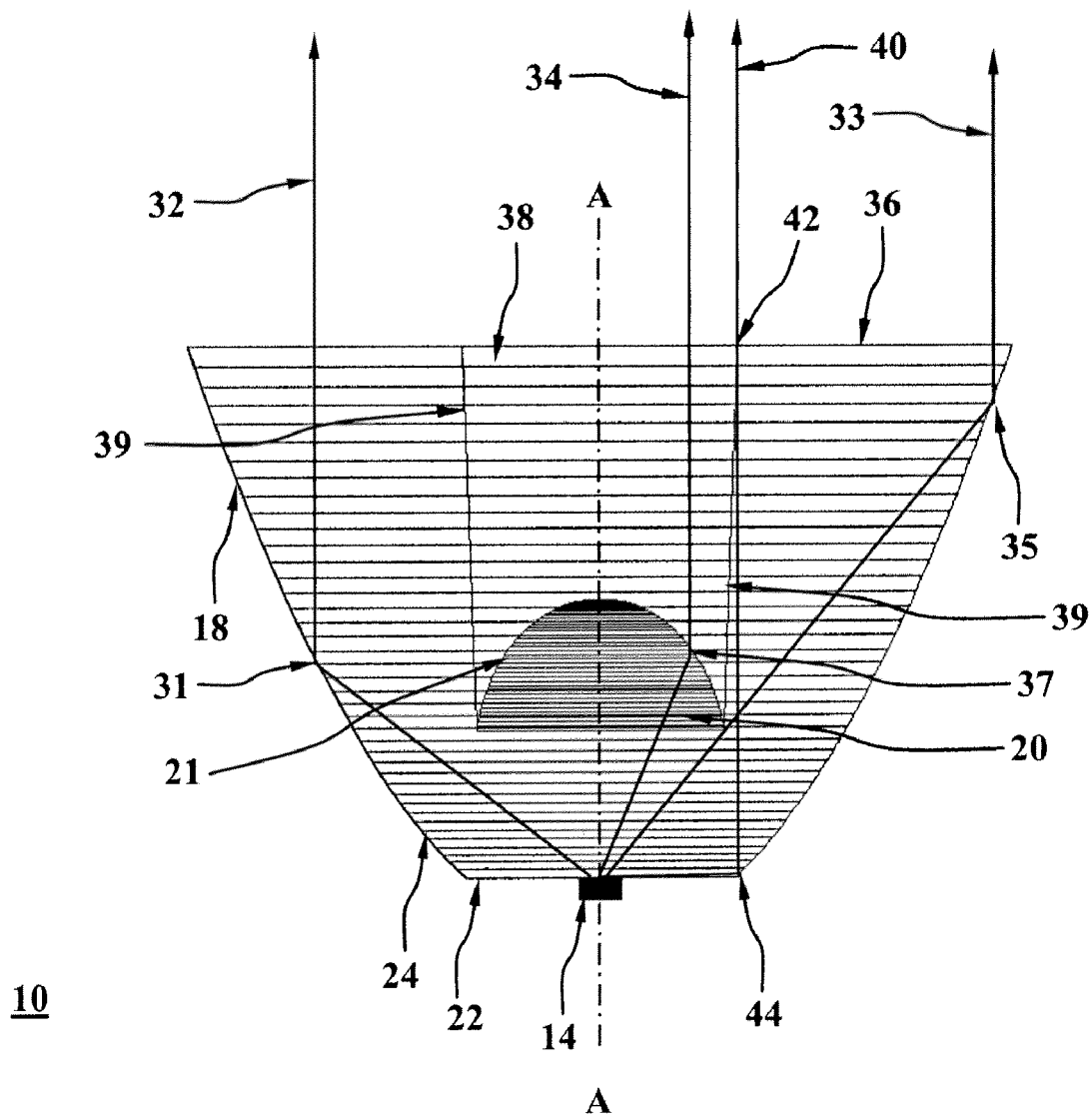
FIG. 2 is a cross-sectional view of a condensing element in accordance with an exemplary embodiment of the present invention.

A condensing element 10 in accordance with an embodiment of the present invention is illustrated in FIG. 2. The condensing element 10 includes an outer section 18, an inner section 20, a light input surface 22, and a light output surface 36. The present invention provides a number of advantages including providing a condensing element 10 that may be optically coupled to one or more light sources 14, such as an LED, to provide high-efficiency light concentration.

Referring more specifically to FIG. 2, the condensing element 10 is formed as a monolithic structure, although the condensing element can formed as two or more structures. The condensing element 10 may be made of any material that is substantially transparent to the light emitted by the source 14. Furthermore, the material should also be easily molded or formed into the shape described in accordance with the present invention.

Suitable materials according to the present invention include, glass, substantially optically transparent polymers such as acrylic polycarbonate, polyester, polystyrene, and other types and numbers of materials. Additionally, the material of the condensing element 10 has a refractive index between about 1.4 and 1.7, although the condensing element could include other ranges for the refractive index.

The condensing element 10 has a bowl-shaped outer section 18, a lens-shaped inner section 20, a light input surface 22, and a light output surface 36 although the condensing element 10 could have other types and numbers of sections in other configurations. The outer and inner sections 18 and 20 and the input and output surfaces 22 and 36 are integrally formed together, although these sections can be formed or connected together in other manners.

The outer section 18 is formed of solid material. Within the outer section 18 is a hollow recess 38 that is substantially cylindrical in shape, whose sides are substantially parallel to the optical axis A-A. At the bottom of the recess 38 is a lens 21. The depth of the recess 38 is such that light from the source 14 does not directly reach the output surface 36, but instead is incident either on the lens 21, or the outer section sidewall 24. That is, the output surface 36 is in the shadow of the lens 21, at the bottom of the recess 38, with respect to the source 14. The light from the source 14 is prevented from directly reaching the output surface 36 without first being incident on the outer section sidewall 24, because if the light were to do so the light would be refracted or reflected by the output surface 36 into a direction not parallel to the optical axis A-A.

The outer section 18 has a curved one-sided, rotationally symmetric sidewall configuration, although the outer section 18 may have other types and numbers of sides, shapes, and configurations, such as four-sided, six-sided, eight-sided, triangular, square, and rectangular. The outer section 18 could have an asymmetric configuration. The mathematical expression describing the profile of the outer section 18 can be a polynomial, a paraboloid, or it can be described in a piecewise linear fashion by a series of coordinates.

The input surface 22 preferably has a plano configuration to facilitate the attachment of the source 14, although the base of the input surface 22 may have other configurations, such as convex or concave. The input surface 22 may also have a small recess in which an adhesive is placed to facilitate bonding of the condensing element 10 to a substrate or assembly in which the source is installed. Typically, the input surface 22 is a few millimeters wide. The light source is typically an LED die or chip, and is in optical contact with the element 10. Light from the source 14 is nominally emitted into a full hemisphere into the element 10, although it can be less than a hemisphere.

The outer section sidewall 24 is formed to have a curvature that provides substantially total internal reflection of light entering at the base of the input surface 22, although the sidewall could have other properties and configurations. In particular, the slope angle of the outer section sidewall 24 is designed so that light from the source 14 will be substantially totally internal reflected at all locations on the outer section sidewall 24, and upon total internal reflection the reflected light will propagate in a direction substantially parallel to the optical axis A-A. This configuration, provided that the output surface 36 has no optical power, will generate output light that has the greatest degree of collimation.

Figure 3:
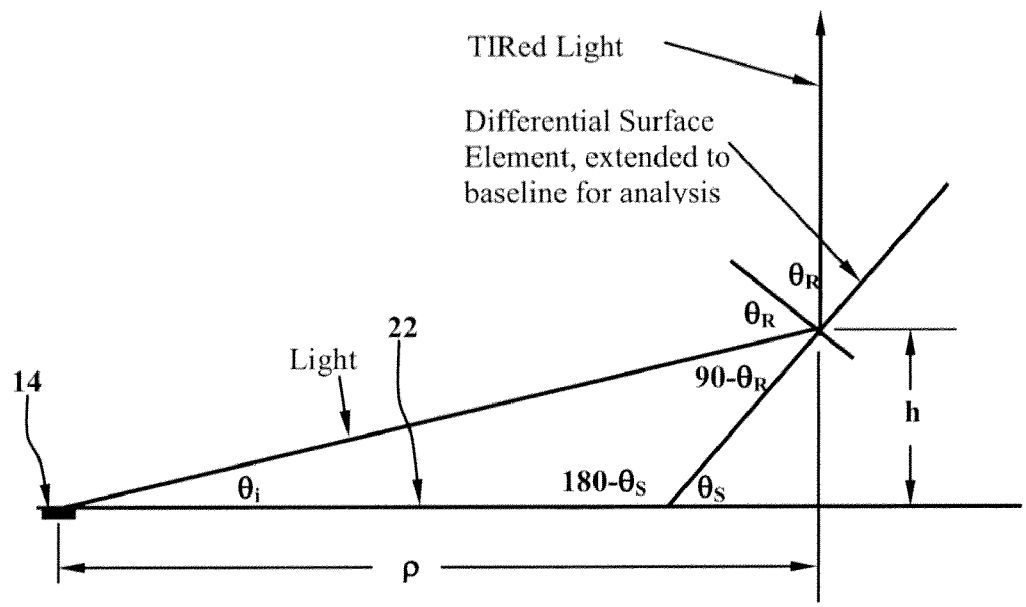
FIG. 3 is a diagram of an example of geometrical calculations for generating a TIRing outer section in a condensing element.

A diagram illustrating an example of the geometrical calculations for determining the curvature of the outer section sidewall 24 to generate TIR in the outer section 18 is illustrated in FIG. 3. In these calculations, the variables are:

$\Theta_I$: The light exit angle from the source 14 with respect to the base of the input surface 22;

$\Theta_S$: The instantaneous angle of a differential TIRing surface element of the outer section sidewall 24 surface with respect to the surface of the base of the input surface 22;

$\Theta_R$: The angle of incidence that the light makes with the differential surface element of outer section sidewall 24;

h: The vertical distance from the base of the input surface 22 to the point of incidence 31;

$\rho$: The lateral distance from the light source 14 to the point of incidence 31.

Additionally, in these calculations $\tan \Theta_I = h/\rho$ which can be restated as $\Theta_I = \tan^{-1}(h/\rho)$. By inspection $\Theta_S = \Theta_R + \Theta_I$, and
$180 = \Theta_I + (180 - \Theta_S) + (90 - \Theta_R)$.
$\Theta_R = \Theta_I - \Theta_S + 90$, so $\Theta_S = \tan^{-1}(h/\rho)/2 + 45°$.

A spreadsheet can be prepared from these calculations with the coordinates of the profile, $\rho$ and h, as input variables, and the instantaneous slope $\Theta_S$ of the TIRing outer section sidewall 24 surface as the output variable. For the condensing element 10 of the present invention, such a spreadsheet is illustrated in FIG. 4.

Figure 7:
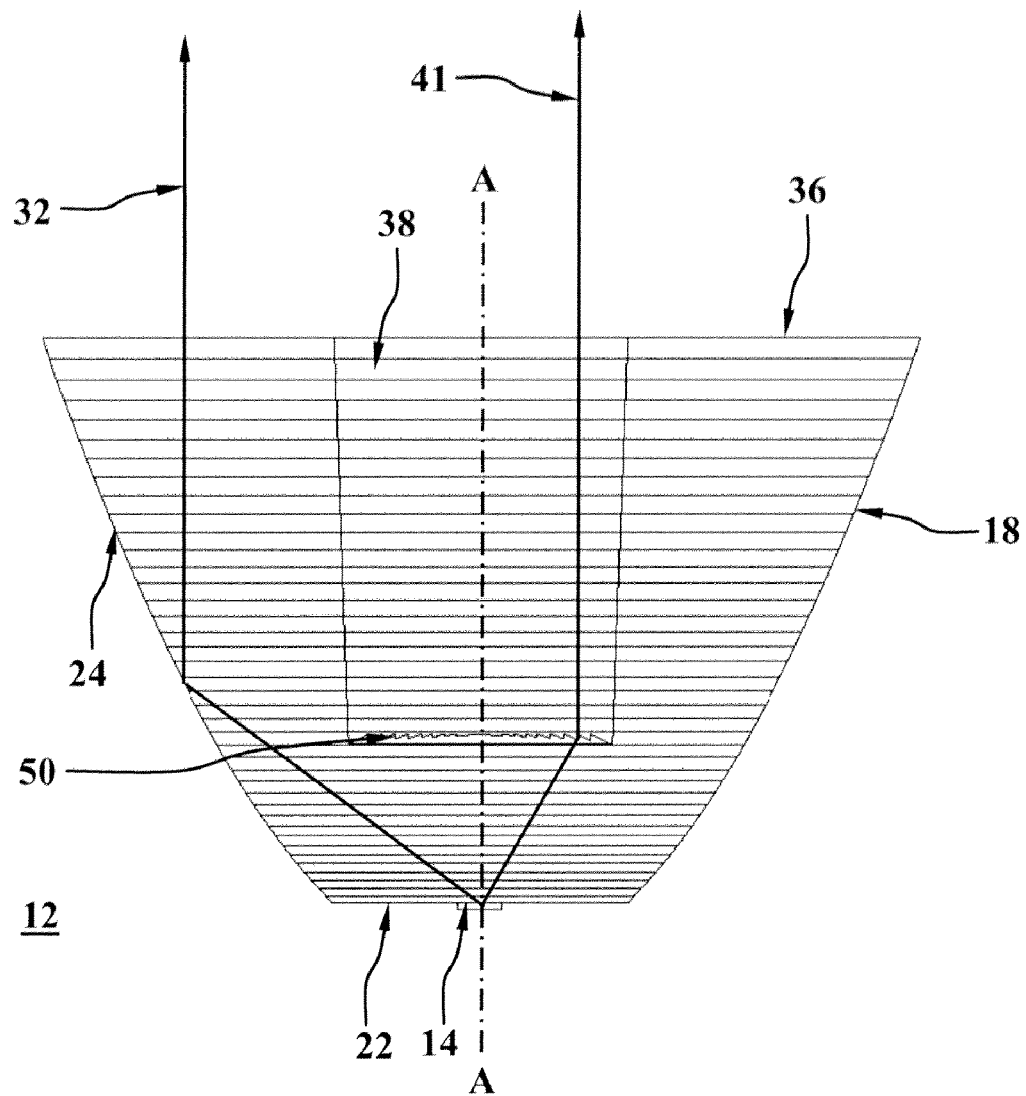
FIG. 7 is a cross-sectional view of a condensing element in accordance with an exemplary embodiment of the present invention in which the lens-shaped inner section is a Fresnel lens.

Referring again to FIG. 2, the inner section 20 is lens-shaped and has a rotationally symmetric configuration, although the inner section 20 may have other configurations and other types and numbers of sides, such as four-sided, six-sided, eight-sided, triangular, square, and rectangular and could have an asymmetric configuration. The inner section 20 is located at the bottom of the hollow recess 38 which is positioned along the optical axis A-A. The inner section 20 includes a refracting lens, such as a convex lens, a Fresnel lens, or a TIRing Fresnel lens. The lens can have a spherical prescription, an aspherical prescription, or it can be elliptical in cross-section. One alternate type of lens for the inner section, a Fresnel lens 50 is shown in FIG. 7 for optical condensing element 12.

As shown in FIG. 2, the light rays emitted by the source into the hemisphere are treated in two different ways by the condensing element 10. Rays 32, 33, and 40 that exit the light source 14 obliquely become incident onto the surface of the TIRing outer section sidewall 24, and exhibit total internal reflection as described earlier. After TIR, the light rays propagate in a direction that is substantially parallel to the optical axis A-A of the light source. This light is then incident onto a substantially plano annular output surface 36, and the light refracts through it largely unchanged in direction. Other rays, such as ray 34, which exit the source non-obliquely, such as within a cone subtending about plus or minus 40° relative to the optical axis A-A, become incident on lens 21 located at the bottom of recess 38. The prescription of this lens is such that the light source 14 is located at the focal position of the lens, and the light that exits from the lens 21 is substantially parallel to the optical axis A-A. The radius of curvature of the lens is generally approximately the same as the diameter of the input surface 22, and can be between 1 mm and 10 mm.

As mentioned earlier, the lens 21 is located at the bottom of a recess 38 within the annular output surface 36. The depth of the recess is such that light from the source 14 does not directly reach the output surface 36, because if so this light would refract through the output surface 36 and exit in an undesired direction and manifest itself as stray light. By recessing the lens 21 of the inner section 20, the output surface 36 is in the shadow of the lens 21, and light from the source 14 does not directly reach the output surface 36. There are two conditions that are considered for determining the relative sizes of the lens 21, the input surface 22, and the output surface 36. The first condition is illustrated by ray 40 which represents light emitted form the source nearly perpendicular to the optical axis A-A. Ray 40 exits from the source 14 in a direction nearly perpendicular to the optical axis A-A, and is incident upon the surface of the TIRing outer section sidewall 24 at a point of incidence 44 very near the input surface 22. Ray 40 is then TIRed into a direction substantially parallel to the optical axis A-A. This ray misses the outer perimeter of the lens 21 as it propagates towards the output surface 36. That is, the position of the start of the surface of the TIRing outer section sidewall 24 at the input surface 22 must be large enough so that ray 40 misses the lens 21. Thus, the diameter of the input surface 22 is greater than or equal to the diameter of the lens 21.

The recess sidewall 39 can be drafted to facilitate molding of the element in accordance with manufacturing techniques known to those skilled in the art. Additional clearance can be provided to ensure that rays exiting from the source 14 in a direction nearly perpendicular to the optical axis A-A, such as ray 40, also miss the sidewall 39 of the recess 38 and intersects the output surface 36 at a point 42. Thus, the diameter of the input surface 22 is greater than or equal to the diameter of the opening of the recess 38 at the output surface 36.

The second condition to be considered in determining the relative sizes of the lens 21 and the output surface 36 is illustrated by marginal ray 33. Ray 33 is representative of rays that miss the lens 21 by a small amount. Ray 33 is incident on the surface of the TIRing outer section sidewall 24 at a point of incidence 35. To ensure that a ray from the source is not directly incident on the output surface 36, the height of the output surface 36 can be increased. In so doing the surface of the TIRing outer section sidewall 24 must also be extended upward as well, in accordance with the calculations shown in FIG. 3 and FIG. 4.

The operation of the condensing element 10 will now be described with reference to FIG. 2. A light ray 32 which exits obliquely from the source 14 is transmitted into the outer section 18 of condensing element 10 and strikes the outer section sidewall 24. The curvature of the outer section sidewall 24 provides total internal reflection of the ray 32 at a point of incidence 31, whereupon the ray 32 is reflected into a direction that is substantially parallel to the optical axis A-A. Light ray 32 then passes through the output surface 36.

Another light ray 34 exiting the source 14 at a non-oblique angle strikes the recessed convex lens 21. The prescription of this lens is such that the light source is located at the focal position of the lens, and the light exits from the lens in a direction that is substantially parallel to the optical axis A-A. That is, light ray 34 is incident on the surface of the lens 21 at a location 37, and the light ray 34 refracts through the surface of lens 21 in a direction that is substantially parallel to the optical axis A-A. As can be seen, light rays 32 and 34 exit the condensing element 10 substantially condensed with respect to the optical axis A-A.

Figure 5:
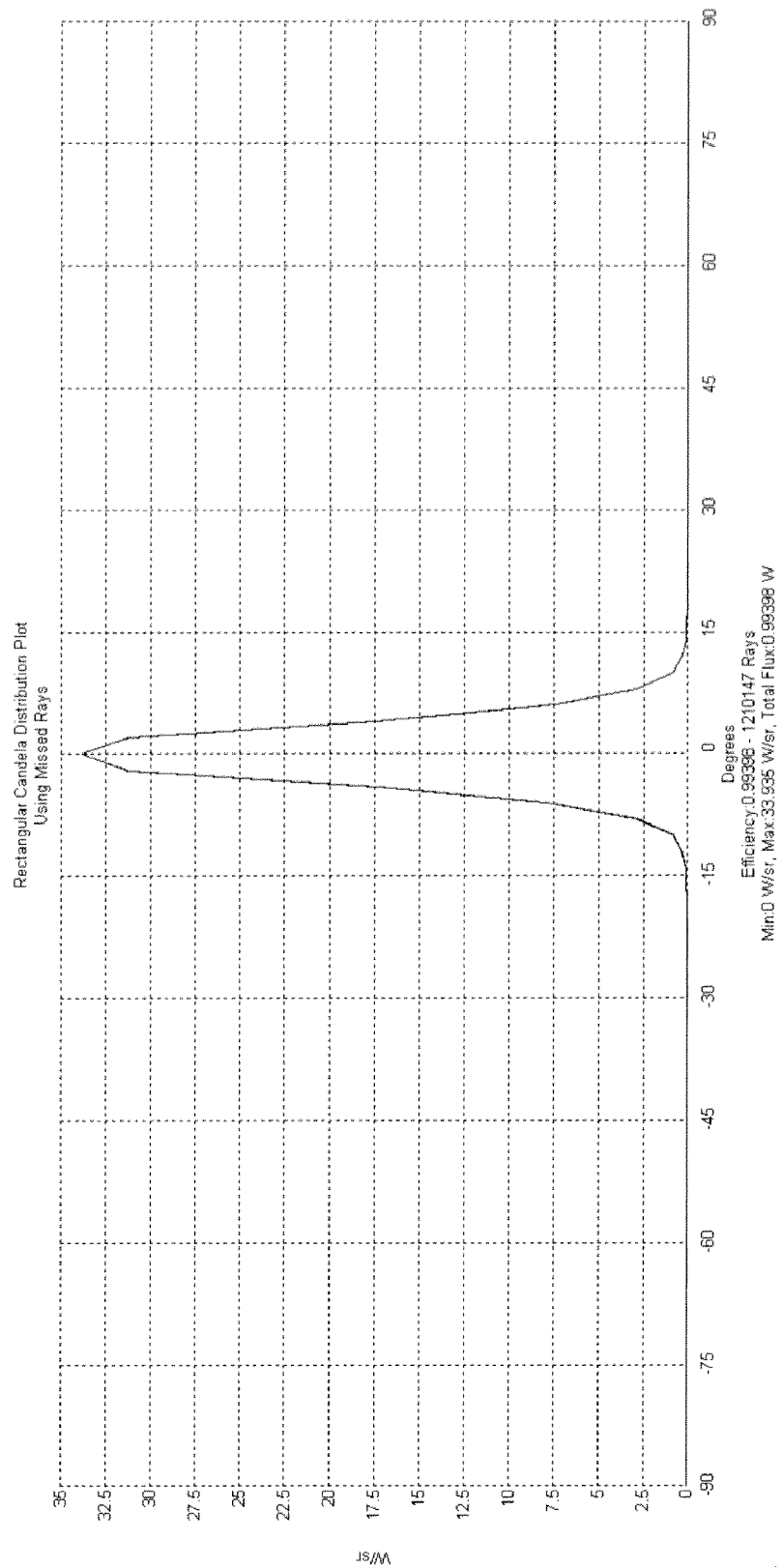
FIG. 5 is a ray trace output graph showing a rectangular candela distribution of condensed output light in accordance with an exemplary embodiment of the present invention.
Figure 6:
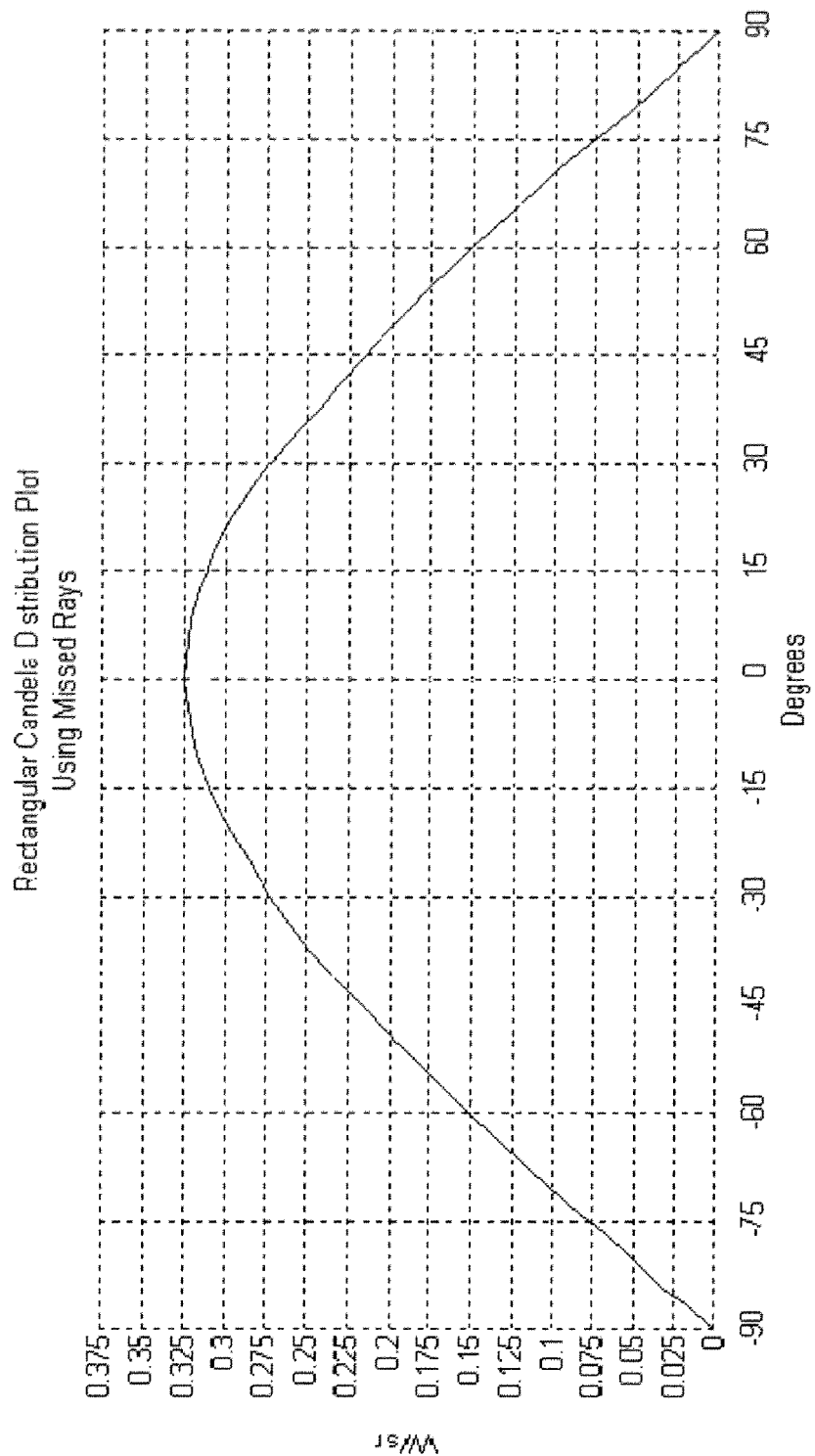
FIG. 6 is a comparative ray trace output graph showing a rectangular candela distribution of output light which has not been subject to a TIRing condensing element in accordance with the present invention.

The effectiveness of the present invention is demonstrated by the ray trace shown in FIG. 5. For comparison purposes, FIG. 6 presents a similar plot of the output light in which the optical condensing element 10 was removed. Note the 100× change in the vertical scale. Further note that the total flux output in FIG. 4, at 0.994 Watt, is very nearly the same as the 1.0 Watt of power entering the lens 21 during the ray trace. That is, owing to the non-absorbing nature of the device, and design of the lens 21 and the surface of the TIRing outer section sidewall 24, virtually all of the light is directed into a forward direction in accordance with the present invention.

The condensing element has a maximum theoretical light-condensing ratio, defined as the on-axis intensity of the light output by the element divided by the on-axis intensity of the light entering the element, of about 100. This occurs when the optical condensing element 10 is set up in a collimation configuration, where light that exits from both the recessed lens of the inner section 20 and the output surface 36 are substantially parallel to the optical axis A-A. There is no light recycling and essentially no stray light.

The angle between the two half-power points of the input or output light is defined as the half-power angle or beam width. The prescriptions of the outer section sidewall 24, output surface 36, and lens 21 can act cooperatively to provide an output emission profile from the condensing element 10 that can have a half-power angle less than or equal to twenty degrees about the optical axis A-A, although other half-power angle distributions could be obtained such as plus-or-minus thirty degrees.

As shown in FIG. 2, a source 14 is attached to the input surface 22 at the intersection with optical axis A-A, although other numbers and types of light sources attached at other locations and in other manners can be used. For example, the source 14 may be partially or fully encapsulated at or within the base of the input surface 22 of condensing element 10. Additionally, by way of example, a plurality of sources, such as a red LED, green LED, and blue LED, may be provided to optically couple with the input surface 22. To ensure TIR in the outer section 18, the LEDs can be provided at or near the optical axis A-A at the input surface 22 and spaced less than 10 mm apart from one another, although other spacing can be used, such as 0.5 mm apart.

The source 14 is positioned to transmit light into condensing element 10. The source 14 may be a colored light source, such as red, green or blue LEDs, or contain phosphor to emit a white colored light. Another way in which to generate white light may include providing red, green, and blue colored LEDs in combination. The present invention may utilize a single source 14, although other numbers and/or types of light sources could be used with the condensing element 10. However, when using more than one light source, the sources are close to one another and near the optical axis A-A of the condensing element 10, although other configurations and locations can be used. The source 14 can be an inorganic LED (iLED), although other types of light sources can be used, such as a light source made from organic materials (e.g., OLEDs). Source 14 is preferably in chip or die format, although the light source can come in other formats, can have leads, and can subsequently be incorporated in the condensing element 10.

FIG. 7 presents an alternate embodiment of the present invention, in which the outer section 18 is substantially unchanged, but the interior lens 21 is replaced with a refracting Fresnel lens 50. As with the conventional lens 21, the focal position of the Fresnel lens 50 is located at the source 14 to achieve maximum light condensing. Also, the diameter of the Fresnel lens 50, and its placement at the bottom of the recess are designed to prevent light from the source 14 from directly reaching the output surface 36 as described earlier. In operation, the light that exits the source 14 in an oblique direction is managed as described previously in connection with FIG. 2. Light that exits the source in a non-oblique direction, such as ray 41, refracts through a groove of the Fresnel lens 50, and exits into a direction along the optical axis A-A, although other exit directions could be obtained as well.

Figure 8:
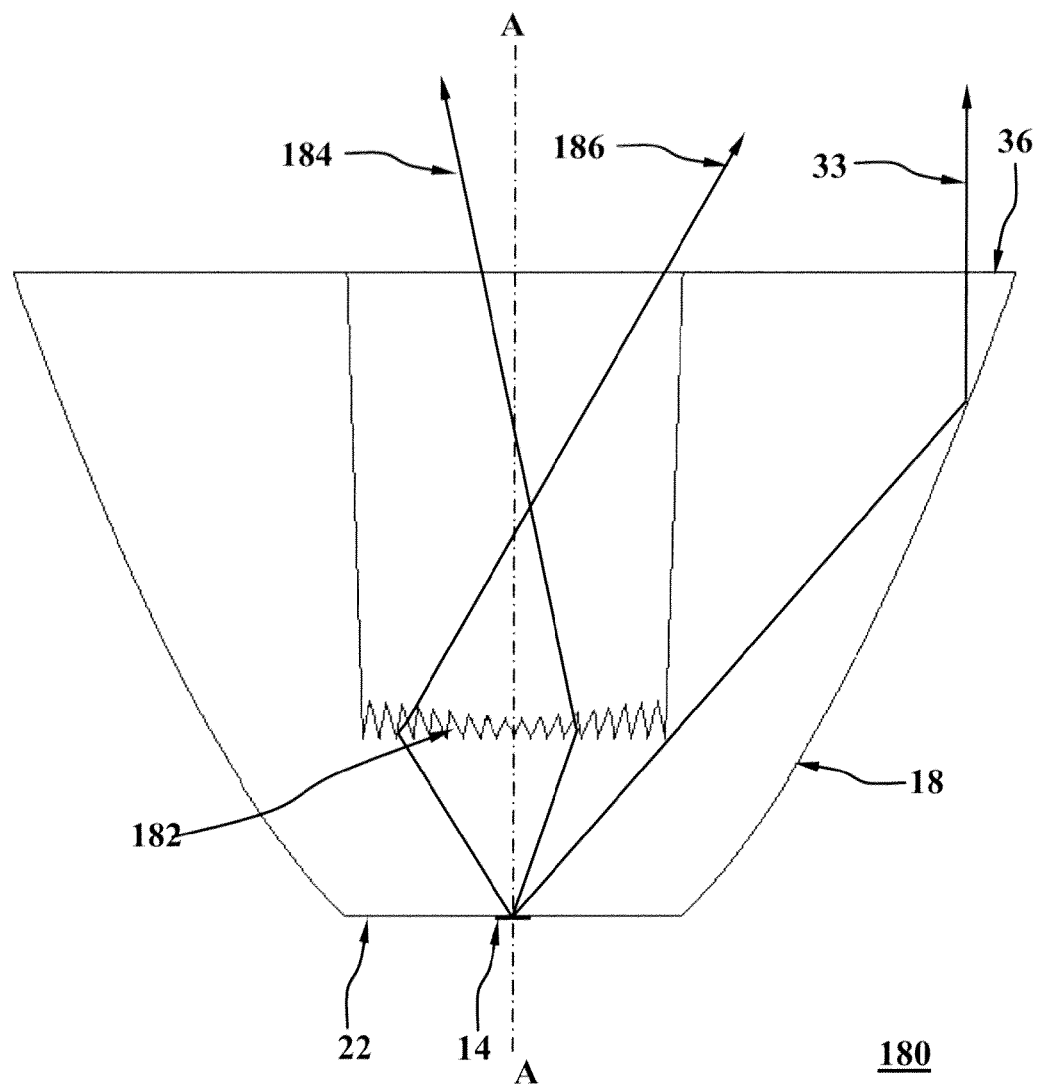
FIG. 8 is a cross-sectional view of a condensing element in accordance with an exemplary embodiment of the present invention in which the lens-shaped inner section is a TIRing Fresnel lens.

In some configurations the lens 21 or Fresnel lens 50 must be optically fast and have small F/#'s (defined as the focal length of the lens divided by its diameter), in which case the performance of these lenses degrades. FIG. 8 presents an alternate embodiment of the present invention, in which the outer section 18 shown in condensing element 180 is substantially unchanged from previously described embodiments, but the interior lens 21 is replaced with a TIRing Fresnel lens 182 whose performance does not degrade with small F/#'s. As with the conventional lens 21, the focal position of the TIRing Fresnel lens 182 is located at the source 14 to achieve maximum light condensing. Also, the diameter of the TIRing Fresnel lens 182, and its placement at the bottom of the recess are designed to prevent light from the source 14 from directly reaching the output surface 36 as described earlier. In operation, the light that exits the source 14 in an oblique direction such as ray 33, becomes incident onto the surface of the TIRing outer section sidewall and exhibits total internal reflection. This light refracts through output surface 36 in a direction substantially parallel to the optical axis A-A. Light that exits the source in a non-oblique direction, such as rays 184 and 186, TIRs and refracts through a groove of the TIRing Fresnel lens 50, and exits in a direction not substantially parallel to the optical axis A-A, although other exit directions could be obtained as well.

Much of the discussion to this point has implicitly and explicitly referred to condensed light that exits the optical element in a direction substantially parallel to the optical axis A-A. However, there are many applications where a high degree of collimation is not necessary, or where a certain non-collimated emission profile is desired. In these cases, any one or more of the three active optical surfaces (light output surface 36, outer section sidewall 24, and lens 21 in FIG. 2) can be modified to obtain a desired output emission profile.

Figure 9:
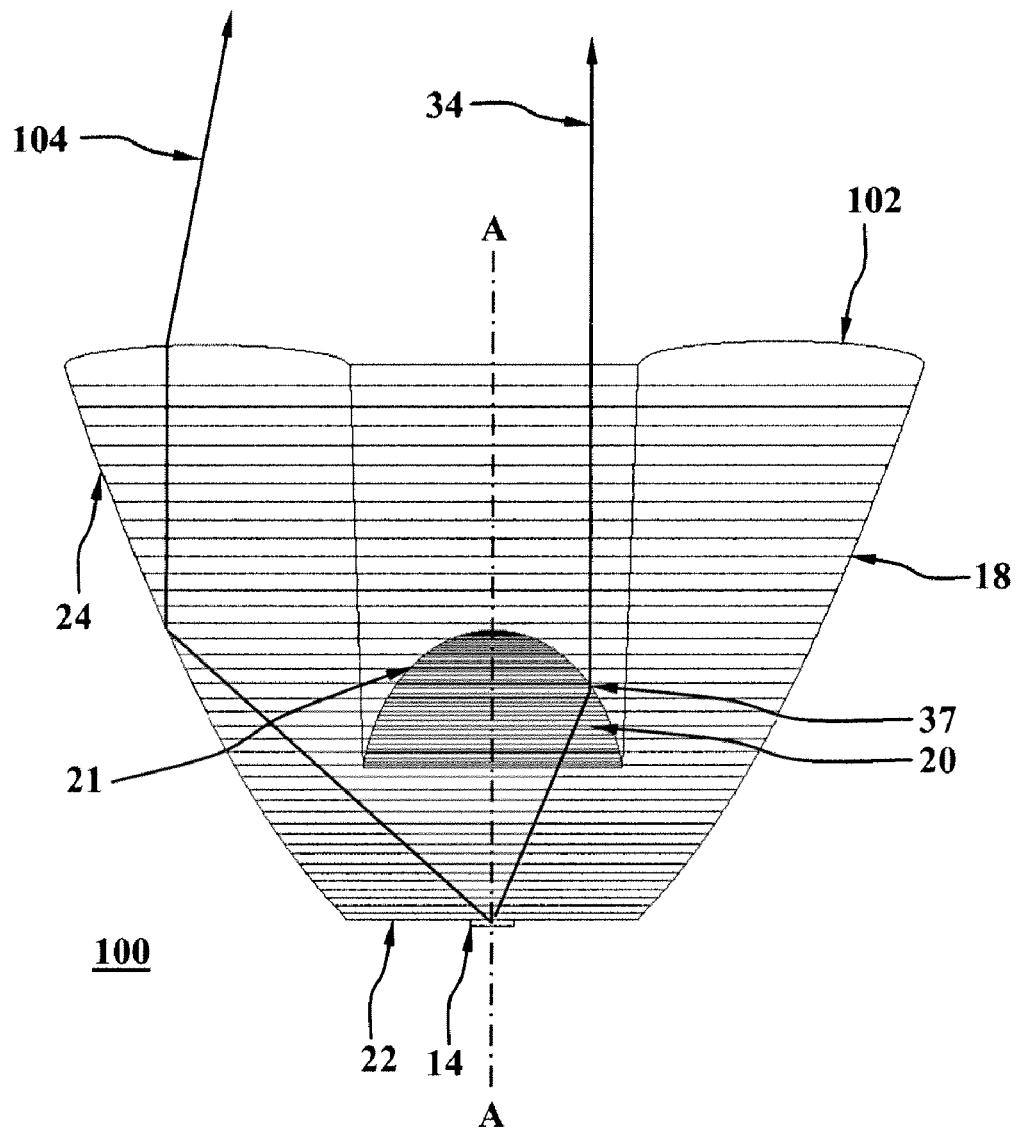
FIG. 9 is a cross-sectional view of a condensing element in accordance with an exemplary embodiment of the present invention in which the output surface has optical power.

For example, in FIG. 9, an optical condensing element 100 is shown in which the output surface 102 has optical power or is otherwise non-plano, and lens 21 and outer section sidewall 24 are in their optimal-collimation configuration. In this case, non-oblique ray 34 behaves as described in connection with ray 34 of FIG. 2. Ray 104 is TIRed into a collimated direction by the outer section sidewall 24, but exits substantially non-parallel to optical axis A-A after passing through non-plano output surface 102.

To broaden the distribution of condensed light output from the output surface 102, the surface is preferably made non-planar in shape. For example, the output surface 102 may be textured, microstructured, curved, or have a diffractive optical element (DOE) installed on it so that the light passing through the output surface 102 will be directed into one or more directions other than substantially parallel to the optical axis A-A. Alternately, the curved or textured output surface 102 can be engineered so that output light is directed into a predetermined output profile that is centered or not-centered on the optical axis A-A, or is symmetric or asymmetric about the optical axis A-A.

Figure 10:
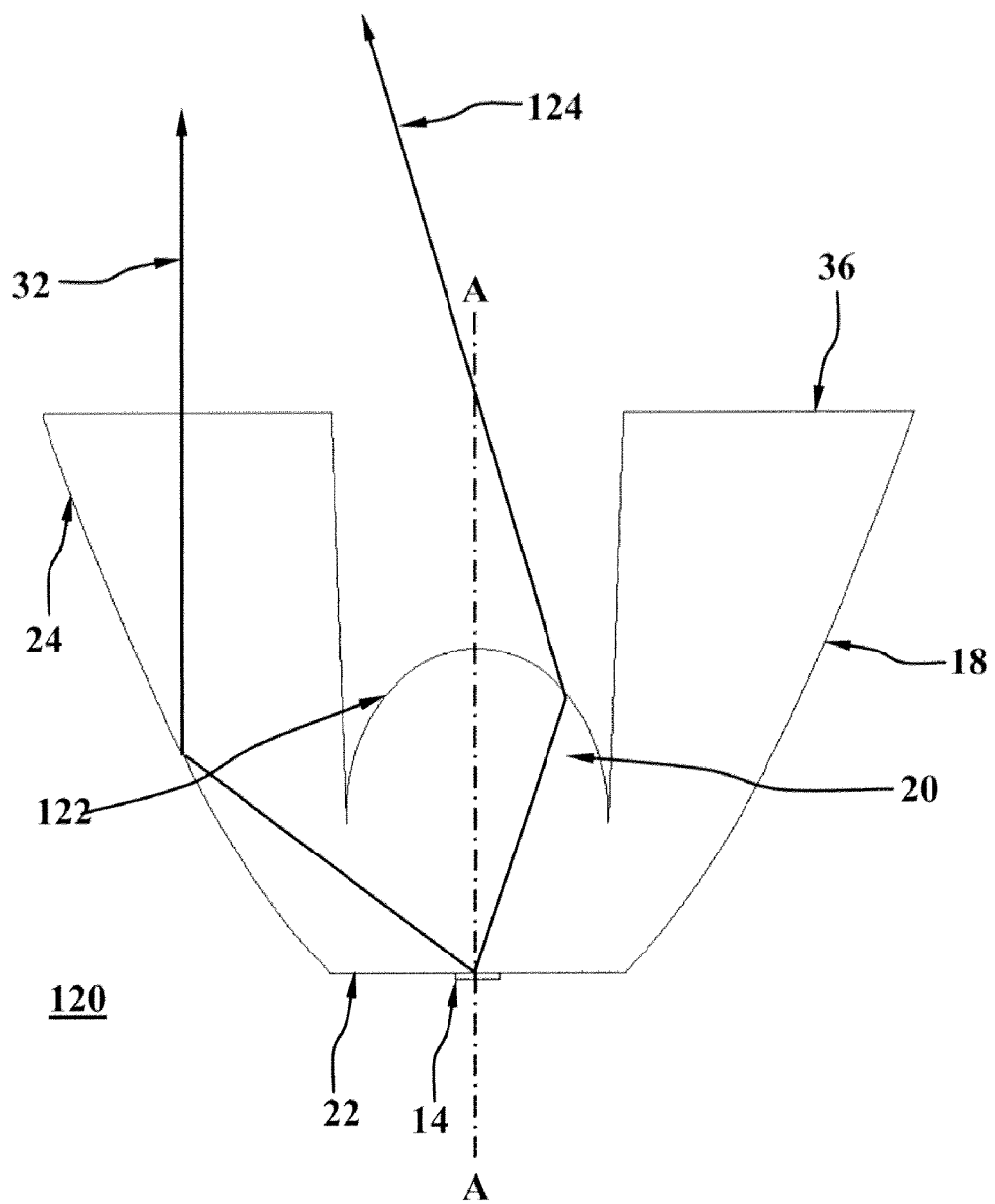
FIG. 10 is a cross-sectional view of a condensing element in accordance with an exemplary embodiment of the present invention in which the rays that exit from the recessed lens-shaped inner section exit in a direction not substantially parallel to the optical axis.

Alternately, the output surface 102 could be non-microstructured (i.e., planar) and the prescription of the recessed lens 122 could be modified as shown in condensing element 120 of FIG. 10. In this case, oblique rays, such as ray 32, behave as described in connection with ray 32 of FIG. 2. However, non-oblique rays will refract through the lens 122 and exit in a direction not substantially along optical axis A-A. To accomplish this, the prescription of the lens could be modified such that it has a longer, or preferably a shorter focal length as shown in FIG. 10. Note this change in lens prescription also applies to the Fresnel lens 50 and TIRing Fresnel lens 182 discussed earlier.

Figure 11:
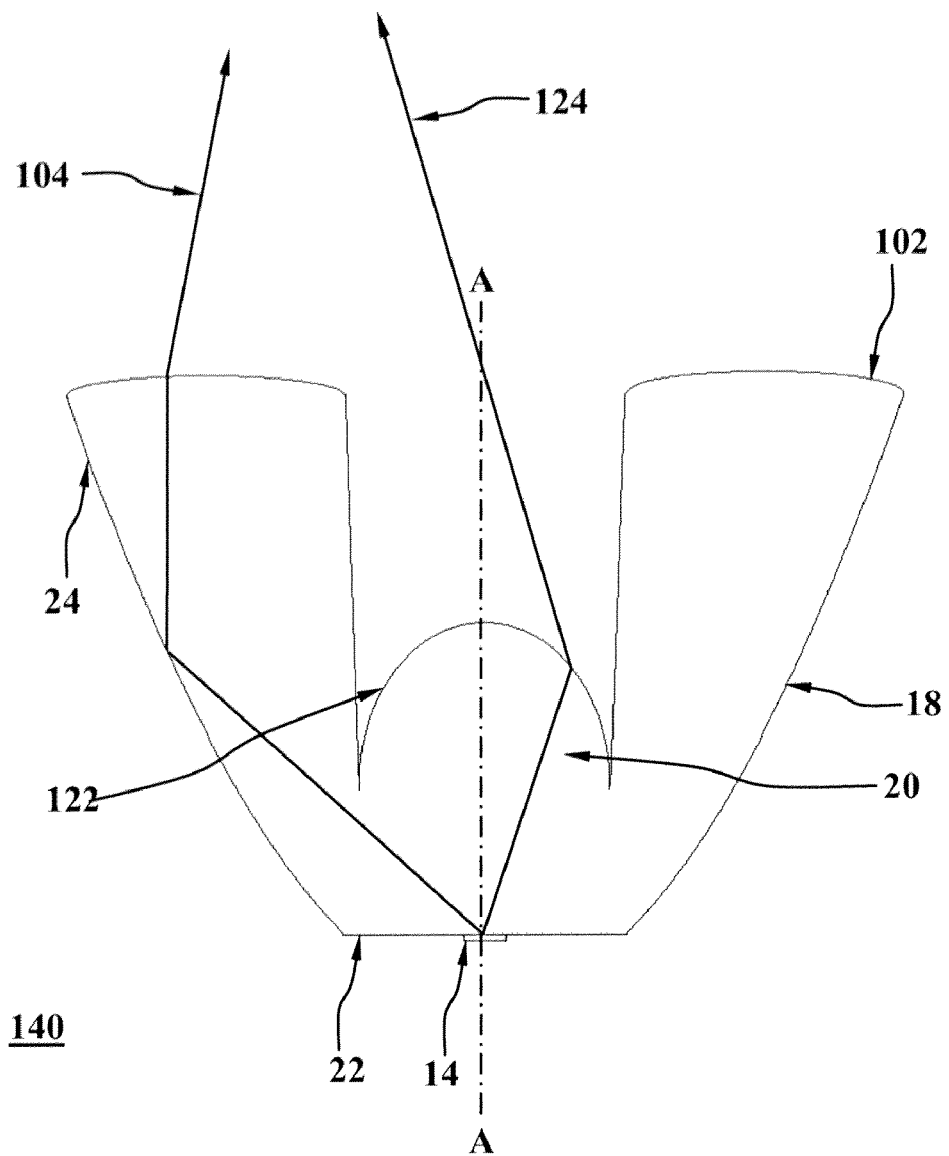
FIG. 11 is a cross-sectional view of a condensing element in accordance with an exemplary embodiment of the present invention in which the rays that exit from the recessed lens-shaped inner section exit in a direction not substantially parallel to the optical axis and in which the output surface has optical power.

FIG. 11 illustrates a condensing element 140 in accordance with a further embodiment in which both the output surface 102 and lens 122 prescription have been modified to achieve a non-collimated output distribution. Note that both the oblique ray 104 and non-oblique ray 124 exit in a controlled albeit non-collimated direction.

Figure 12:
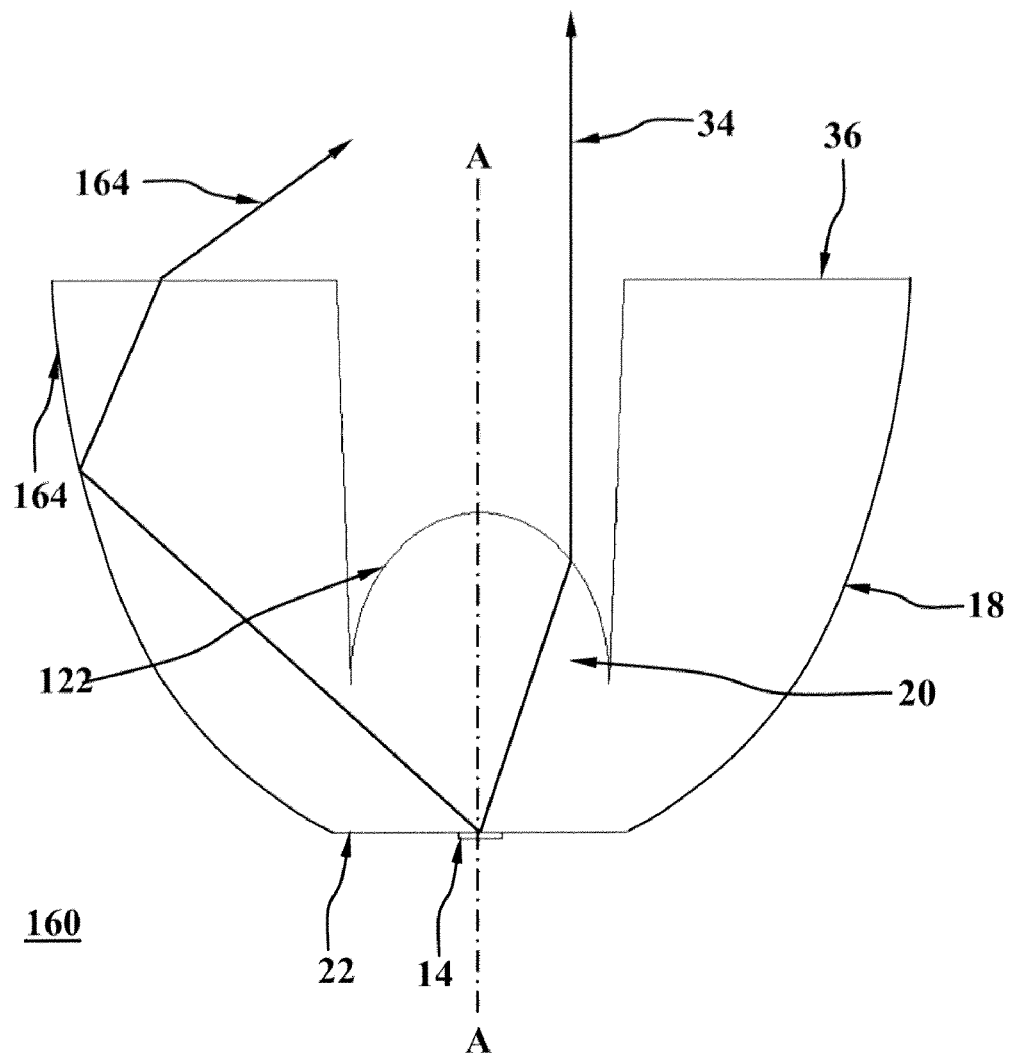
FIG. 12 is a cross-sectional view of a condensing element in accordance with an exemplary embodiment of the present invention in which the rays that exit from the recessed lens-shaped inner section exit in a direction substantially parallel to the optical axis and in which the rays that exit through the output surface do not exit in a direction substantially parallel to the optical axis.

Alternately, as shown in a condensing element 160 of FIG. 12, the prescription of the surface of the TIRing outer section sidewall 164 could be modified to achieve a predetermined and non-collimated optical output profile. In this case, non-oblique rays, such as ray 34, behave as described in connection with FIG. 2. However, oblique rays will TIR from the outer section sidewall 164 in a direction not along optical axis A-A. To accomplish this, the formulas and equations used in connection with FIG. 4 would be modified to achieve the desired effect. After TIRing from the outer section sidewall 164, the rays would be directed onto output surface 36, and refract through it in a direction substantially not along optical axis A-A.

Figure 13:
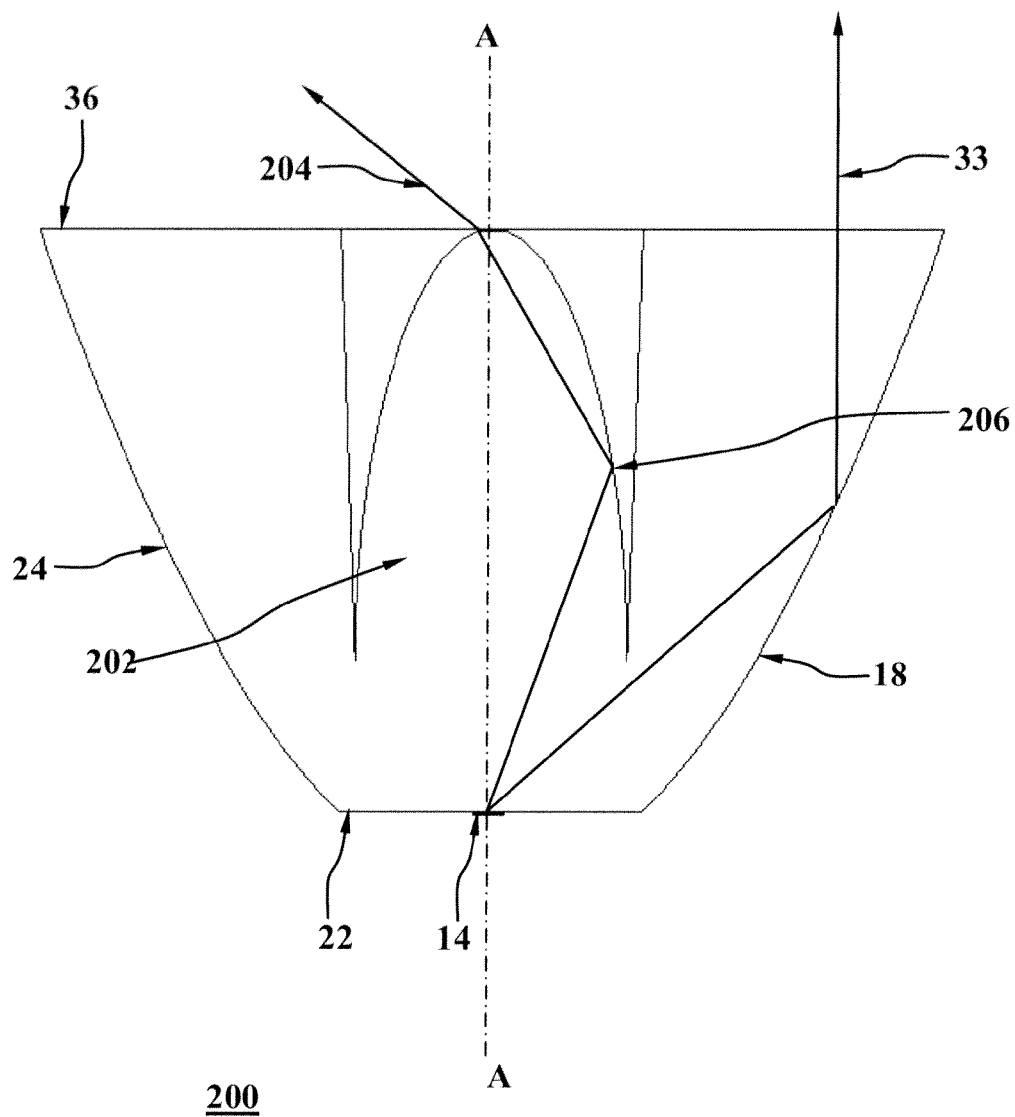
FIG. 13 is a cross-sectional view of a condensing element in accordance with an exemplary embodiment of the present invention in which both the inner section and the outer section utilize TIR.

Yet another embodiment for obtaining non-collimated light condensing is shown in condensing element 200 of FIG. 13. In this configuration the TIRing outer section sidewall 24 and output surface 36 are unchanged from that described in connection with FIG. 2. However, the inner recessed lens 202 has been elongated, even (optionally) to the point where its apex is coplanar with the output surface 36. The lens base diameter, and its location are the same as that described for the recessed lens 21 in FIG. 2 to prevent light from the source 14 from directly reaching the output surface 36. In this configuration, many non-oblique light rays, such as ray 204, will strike the side of the lens 202 at a point 206 and TIR due to its high angle of incidence. The TIRed light ray 204 will then be directed upward towards the apex of lens 202, and will refract through its surface in a direction not substantially parallel to the optical axis A-A.

Figure 14:
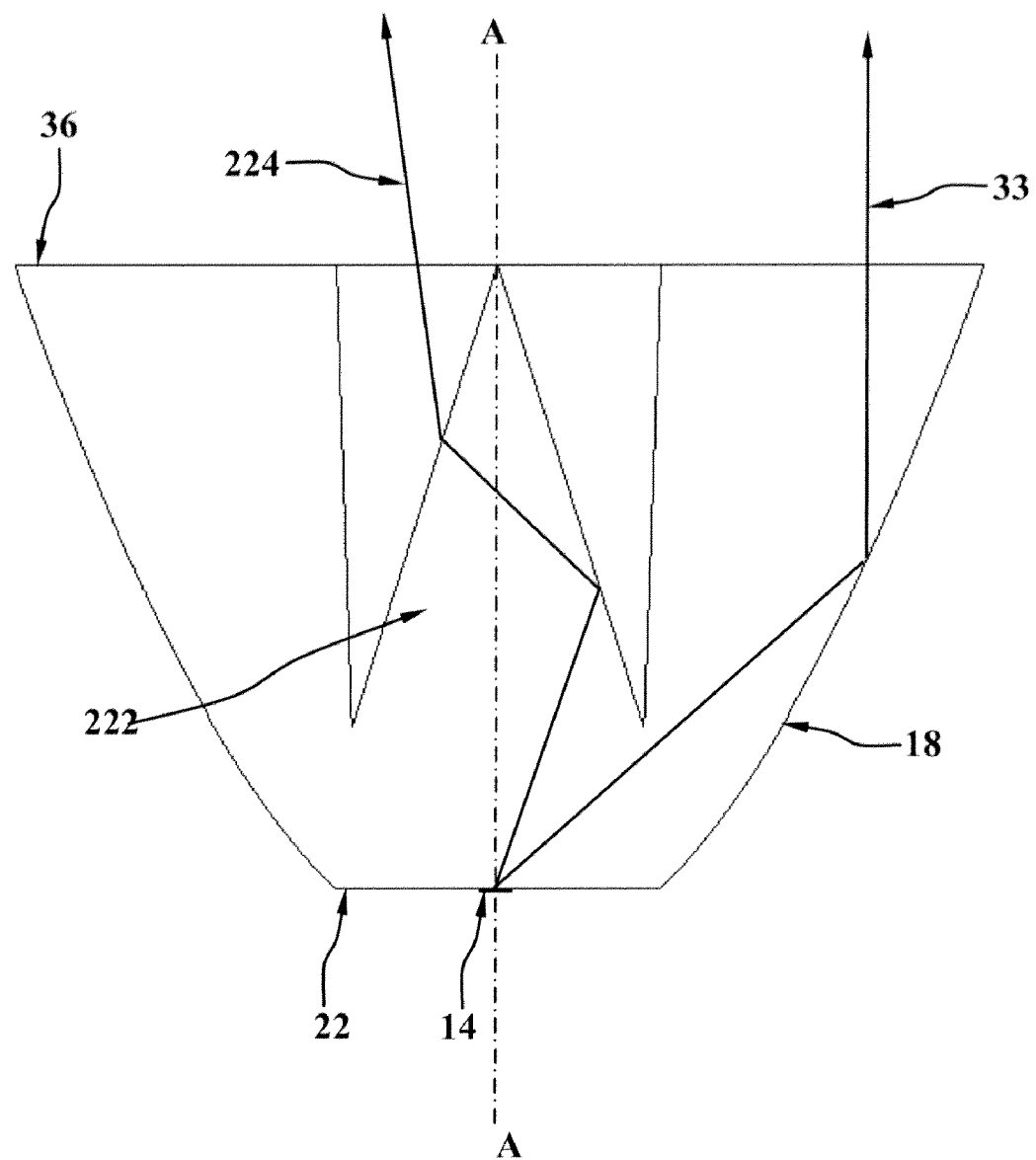
FIG. 14 is a cross-sectional view of a condensing element in accordance with an exemplary embodiment of the present invention in which the inner section is triangular in cross-section.
Figure 26:
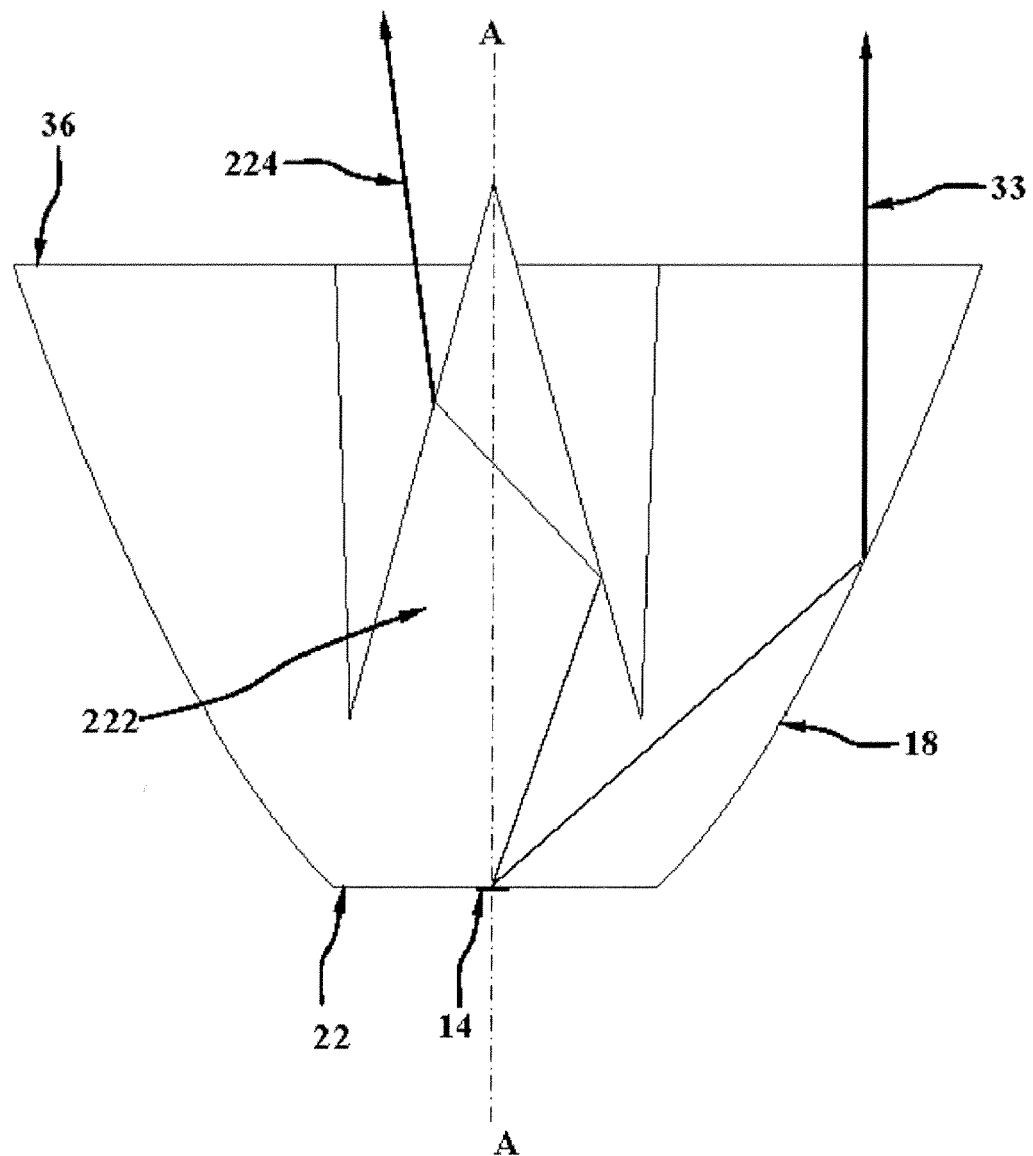
FIG. 26 is a cross-sectional view of a condensing element in accordance with an exemplary embodiment of the present invention.

Yet another embodiment for obtaining non-collimated light condensing is shown in condensing element 220 of FIG. 14. In this configuration the TIRing outer section sidewall 24 and output surface 36 are unchanged from that described in connection with FIG. 2. However, the inner recessed lens has been replaced with a conical structure 222. The peak of the cone 222 can be below the level of the output surface 36, coplanar with output surface 36 as shown in FIG. 14, or even extend above output surface 36, as shown in FIG. 26. However, the cone base diameter, and its location are the same as that described for the recessed lens 21 in FIG. 2 to prevent light from the source 14 from directly reaching the output surface 36. In this configuration, many non-oblique light rays, such as ray 224, will strike the side of the cone 222 and TIR due to its high angle of incidence. The TIRed light ray 224 will then be directed upward towards the apex of cone 222, and will refract through the cone surface.

Figure 15:
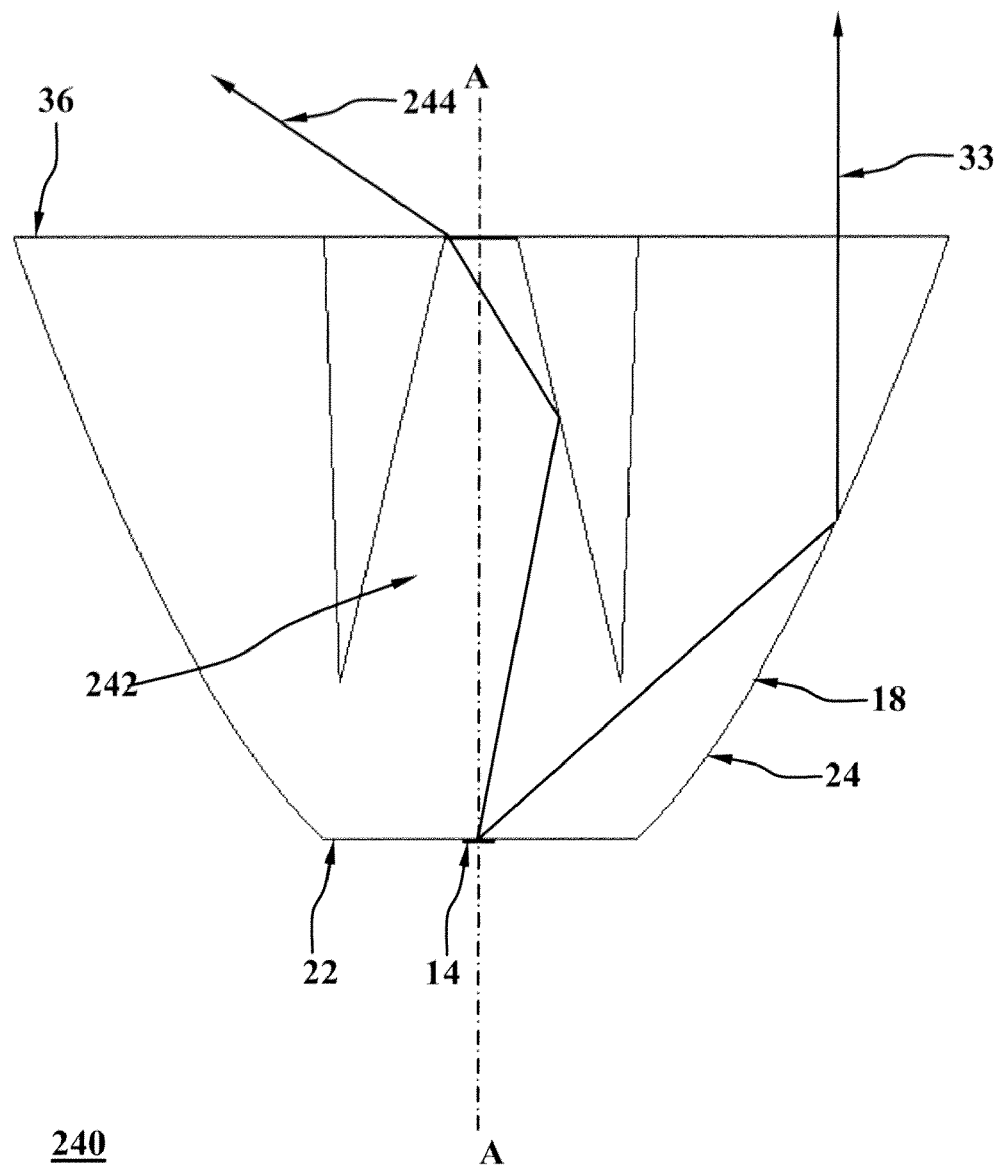
FIG. 15 is a cross-sectional view of a condensing element in accordance with an exemplary embodiment of the present invention in which the inner section is trapezoidal in cross-section.
Figure 27:
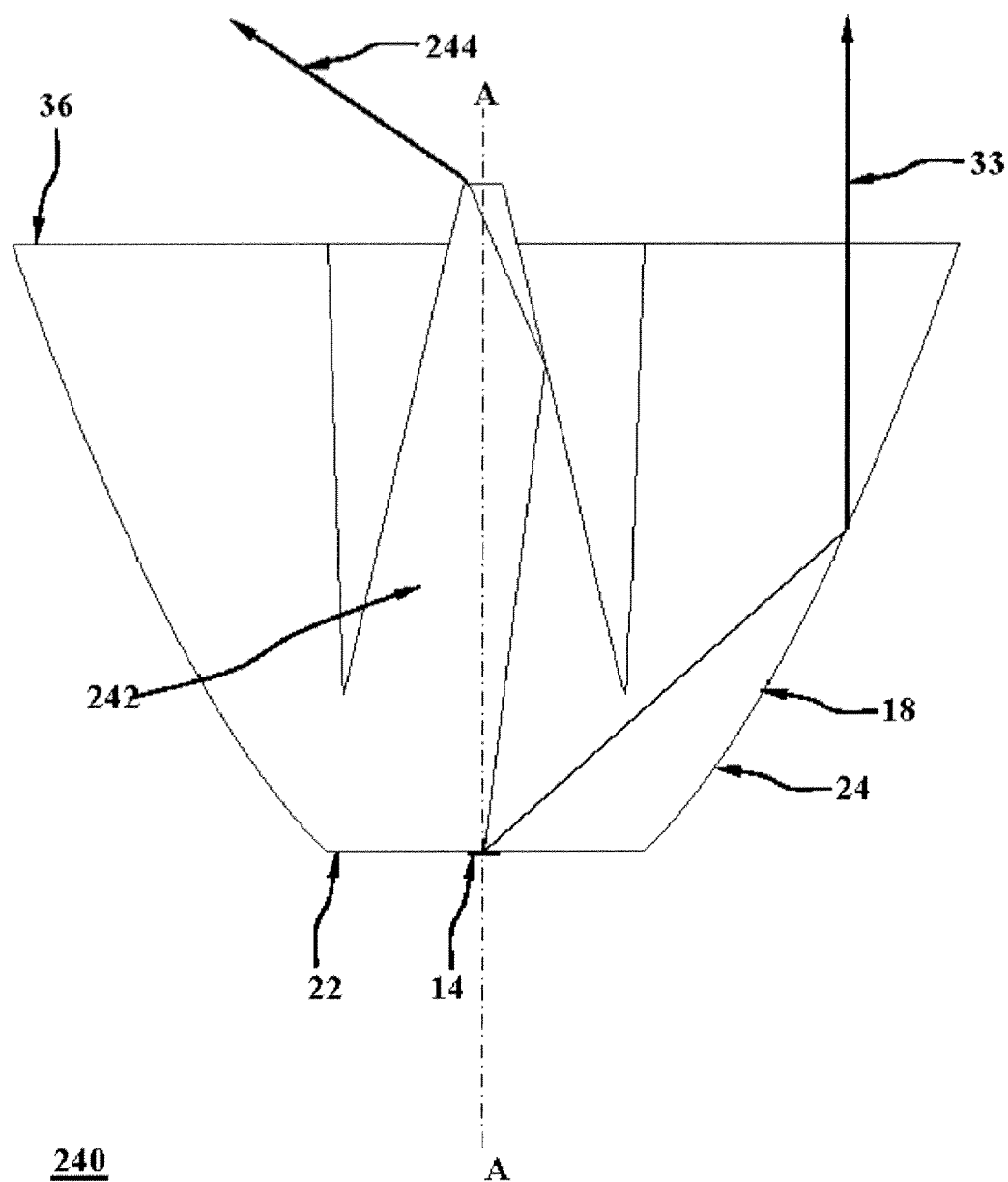
FIG. 27 is a cross-sectional view of a condensing element in accordance with an exemplary embodiment of the present invention.

Yet another embodiment for obtaining non-collimated light condensing is shown in condensing element 240 of FIG. 15. In this configuration the TIRing outer section sidewall 24 and output surface 36 are unchanged from that described in connection with FIG. 2. However, the inner recessed lens has been replaced with a truncated conical structure 242, which is essentially a cone with the top peak removed. The top of the truncated cone 242 can be below the level of the output surface 36, coplanar with output surface 36 as shown in FIG. 15, or even extend above output surface 36, as shown in FIG. 27. However, the cone base diameter, and its location are the same as that described for the recessed lens 21 in FIG. 2 to prevent light from the source 14 from directly reaching the output surface 36. In this configuration, many non-oblique light rays, such as ray 244, will strike the side of the truncated cone 242 and TIR due to its high angle of incidence. The TIRed light ray 244 will then be directed upward towards the top of the truncated cone 242, and will refract through its surface in a direction not substantially parallel to the optical axis A-A.

Figure 16:
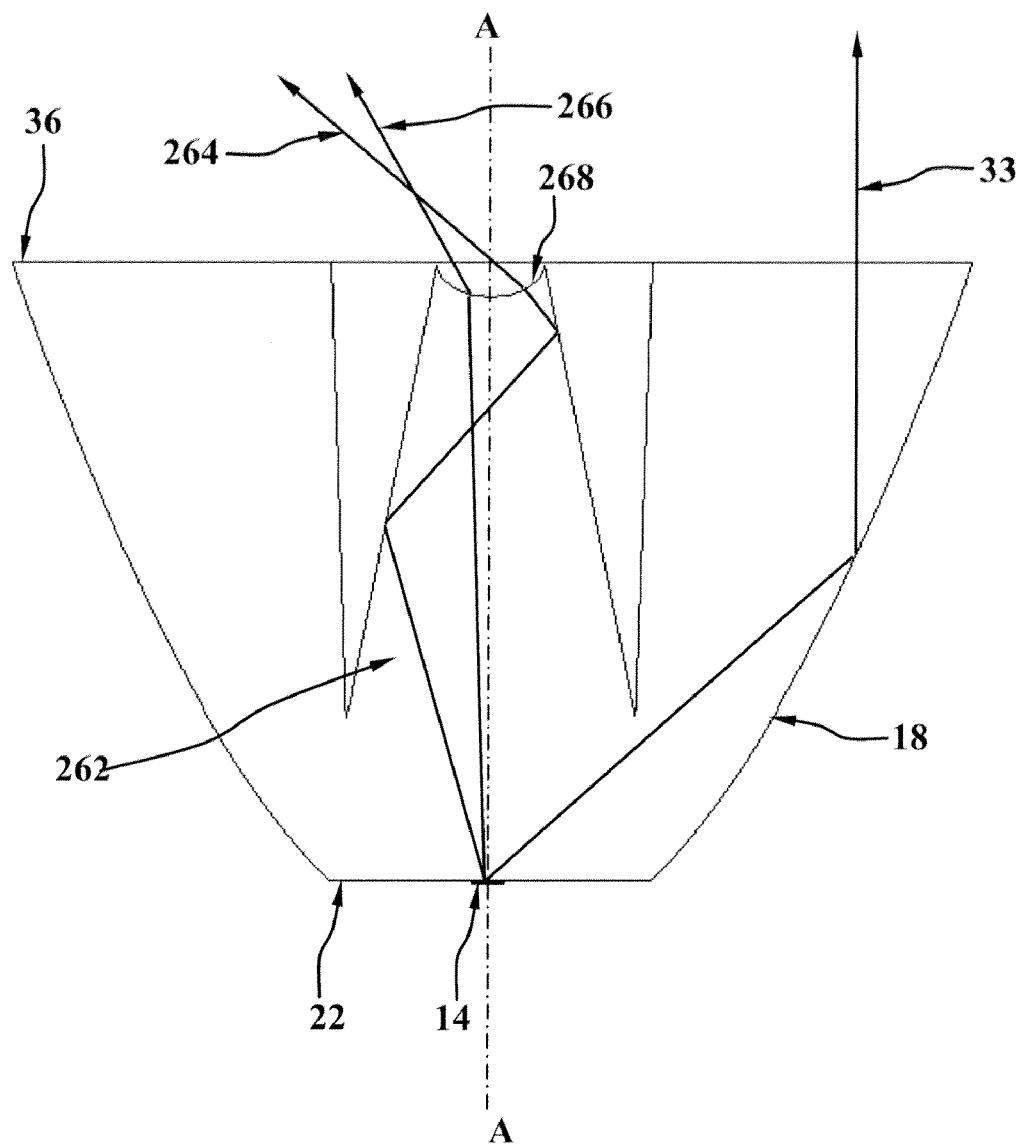
FIG. 16 is a cross-sectional view of a condensing element in accordance with an exemplary embodiment of the present invention in which the inner section has a negative lens.
Figure 28:
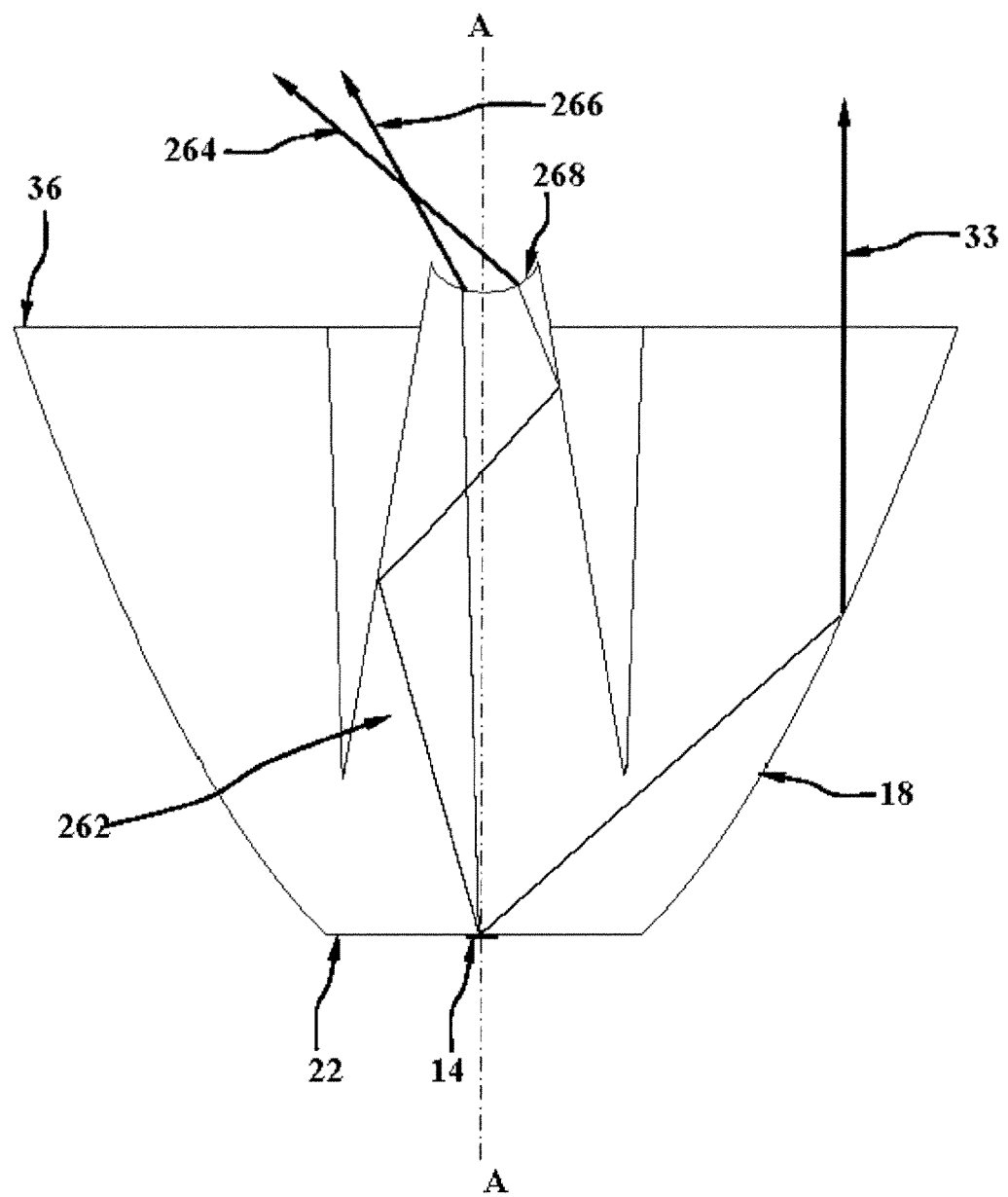
FIG. 28 is a cross-sectional view of a condensing element in accordance with an exemplary embodiment of the present invention.

Yet another embodiment for obtaining non-collimated light condensing is shown in condensing element 260 of FIG. 16. In this configuration the TIRing outer section sidewall 24 and output surface 36 are unchanged from that described in connection with FIG. 2. However, the inner recessed lens has been replaced with a conical structure 262 whose peak has been replaced with a lens-shaped curved surface 268. The uppermost point of the lens-shaped surface 268 atop the conical structure 262 can be below the level of the output surface 36, coplanar with output surface 36 as shown in FIG. 16, or even extend above output surface 36, as shown in FIG. 28. However, the cone base diameter, and its location are the same as that described for the recessed lens 21 in FIG. 2 to prevent light from the source 14 from directly reaching the output surface 36. In this configuration, many non-oblique light rays, such as ray 264, will strike the side of the conical structure 262 and TIR due to its high angle of incidence. The TIRed light ray 264 will then be directed upward towards the lens-shaped surface 268, and will refract through its surface in a direction not substantially parallel to the optical axis A-A. Other non-oblique rays, such as ray 266, will not strike the side of the conical structure 262, but instead will be directly incident upon the lens-shaped surface 268. These rays, such as ray 266, simply refract through the lens-shaped surface 268 in a direction substantially not along optical axis A-A. Note that the lens-shaped surface 268 can be configured as a negative lens as shown in FIG. 16, or it can be a positive lens (not shown).

Figure 17:
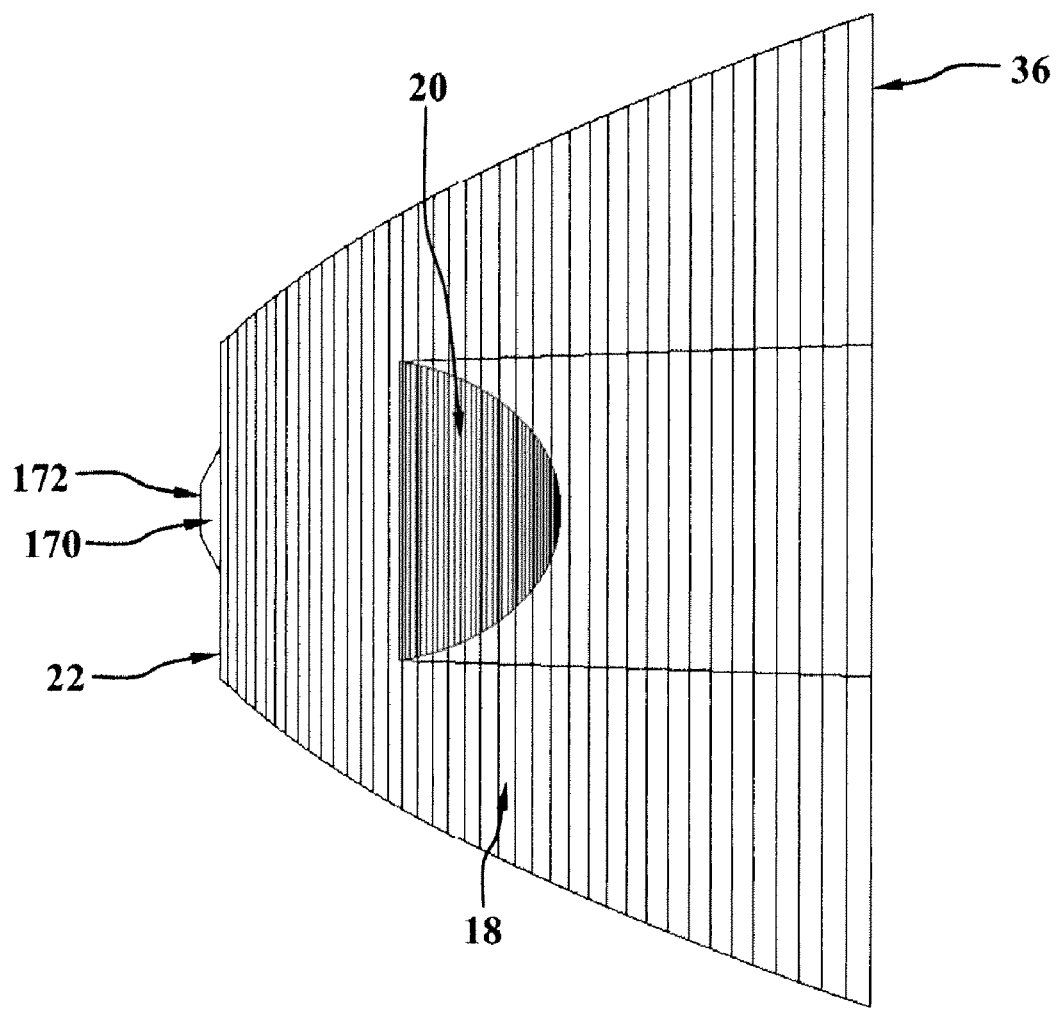
FIG. 17 is a cross-sectional view of a condensing element in accordance with an exemplary embodiment of the present invention in which the base section has a protrusion.

Referring to FIG. 17, the input surface 22 may have a small protuberance 170 at or near the optical axis A-A, onto which the source 172 is placed. The protuberance can be used to facilitate the coupling of the input light into the input surface 22, and also restrict the width of the coupling area to reduce the etendue of the input light. This feature is particularly useful when used in conjunction with a waveguide source, as described later in conjunction with FIG. 21.

Figure 18:
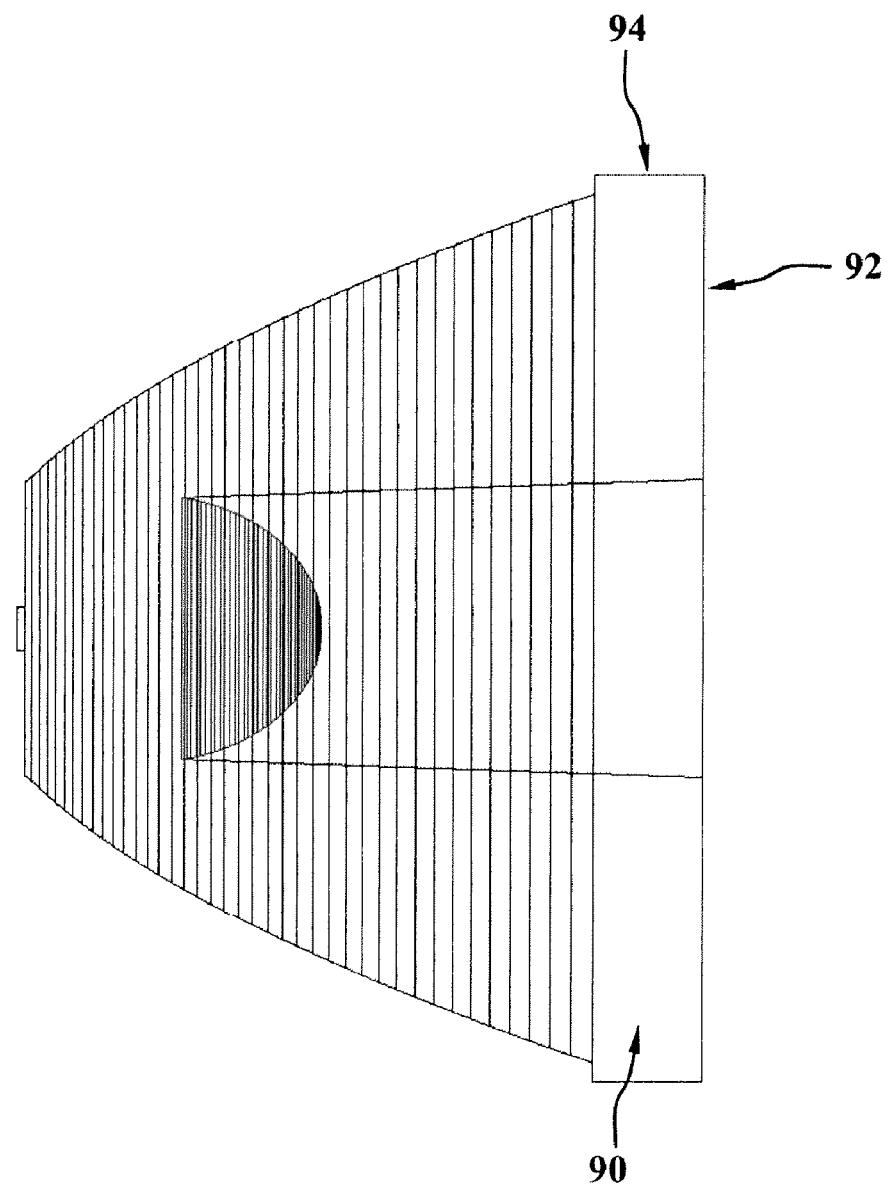
FIG. 18 is a cross-sectional view of a condensing element in accordance with an exemplary embodiment of the present invention in which a thick annular ring is provided at the output surface of the outer section to facilitate molding of the condensing element.

FIG. 18 illustrates yet another embodiment of the optical condensing element. In this example, an additional layer of polymer material 90 is placed atop the output surface. The new output surface 92 has the same characteristics and variations as described previously with respect to the output surface 36. The addition of the layer of polymer material 90 has no detrimental impact on optical performance, but rather is added to facilitate molding of the optical element. Specifically, the thickness of the added material allows for a location of the gate 94, which is used for a molding process. This molding process can be those known in the art, including injection molding, injection-compression molding, casting, and compression molding.

It is to be appreciated that in any embodiment, optical coupling of the source 14 with the input surface 22 can be carried out in a number of ways. For example, the optical condensing element can be adhered to a source 14 using optically transmissive adhesive material, or the source 14 can include leads and the source 14 can be encapsulated in the optical condensing element at the base segment with the leads exposed, or the source 14 can be mechanically fastened to or held against the optical condensing element.

Figure 19:
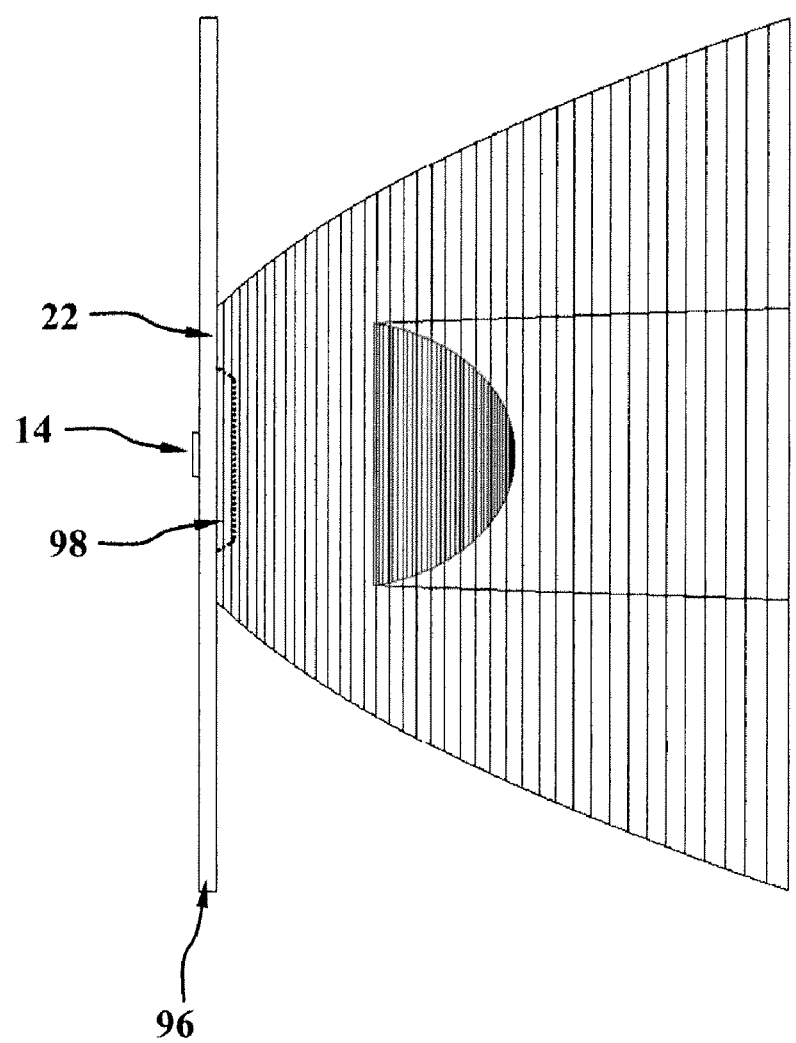
FIG. 19 is a cross-sectional view of a condensing element in accordance with an exemplary embodiment of the present invention wherein a thin sheet of transparent material is installed between the light source and the base section of the condensing element.

One source attachment embodiment as illustrated in FIG. 19 provides for a layer of polymer film 96 between the source 14 and the input surface 22. The film 96 can be adhered or mechanically fastened to the input surface 22, and is often used as part of an assembly in which the source 14 is encapsulated. Furthermore, an optional recess 98 installed into the input surface 22 can be provided, into which is placed an adhesive used for bonding the condensing element to the film 96, a source 14, or even a waveguide as described later in conjunction with FIG. 21.

Another exemplary embodiment described herein involves an array of monolithic, compact and highly efficient condensing optical elements that are well suited to condense the light emitted from two or more substantially separated light sources, such as LED dies. The spacing between the LED die sources can be less than 10 mm. These embodiments locate light sources in an array of spatially separated condensing optical elements. Typically, but not necessarily, one source is used per condensing element.

Figure 20:
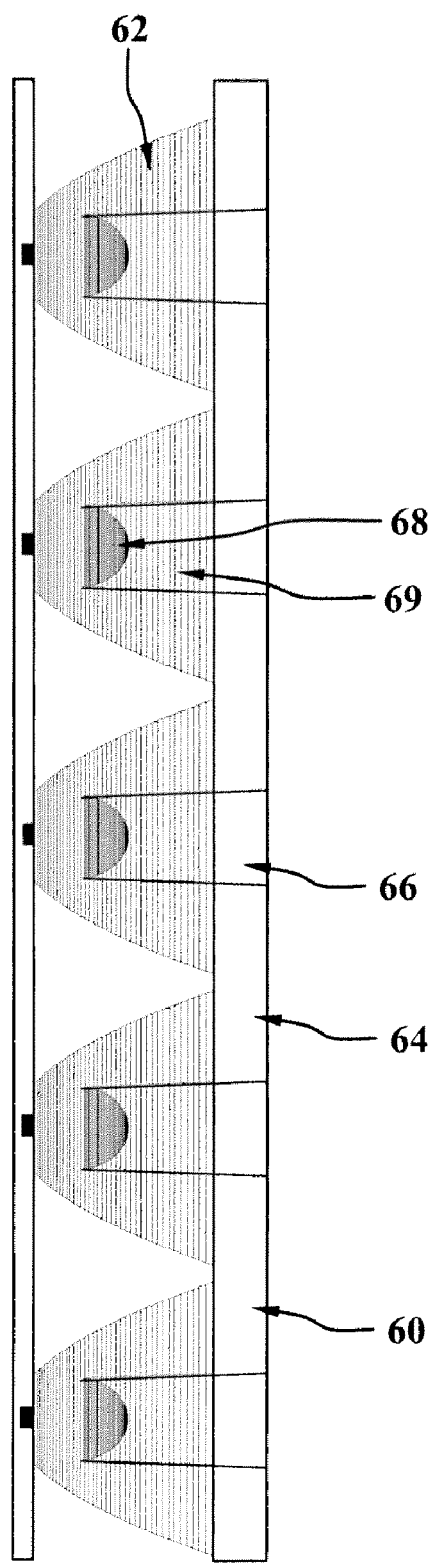
FIG. 20 is a cross-sectional view of an array of condensing elements in accordance with an exemplary embodiment of the present invention.

FIG. 20 illustrates one example of multiple condensing elements produced in an array in an injection molding or injection/compression process of the present invention. A monolithic array 60 of optical elements 62 is shown wherein a plane parallel plate 64 is attached to the front face of the optical elements 62, or co-molded with them. In this embodiment, through-holes 66 are shown in the plate 64 for molding the lens 68. Since the upper plate 64, which attaches all of the condensers 62 together is a plane parallel plate, it has no negative impact on the light output distribution. The plate 64, when produced in an injection molding process, will have holes 66 in it, located above the recesses 69, which are used for molding the lenses 68 at the bottom of the recess 69. Alternatively, the individual condensing elements can be individually molded and adhered to a plane parallel plate with an adhesive, in which the holes 66 would not be needed.

Figure 21:
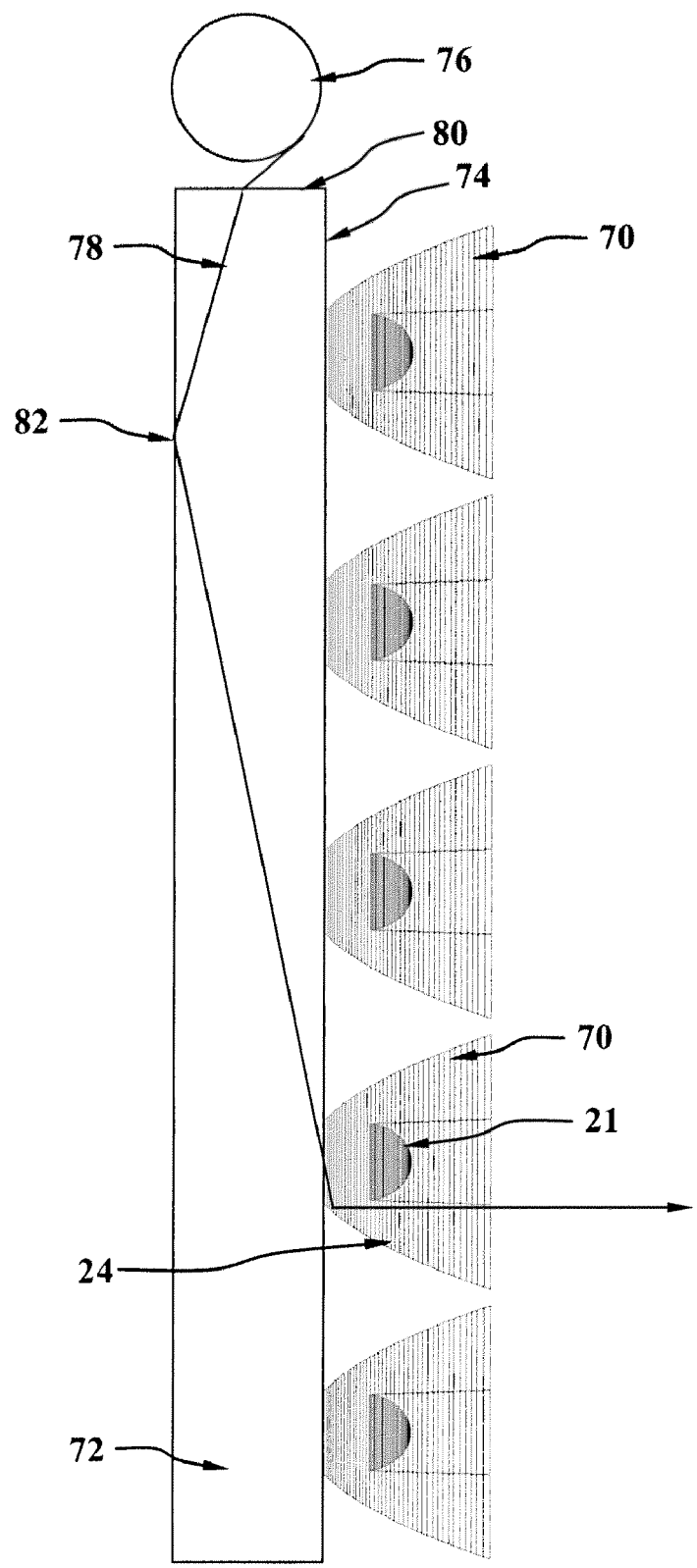
FIG. 21 is a cross-sectional view of a monolithic array of condensing elements used for light extraction from a light guide plate in accordance with an exemplary embodiment of the present invention.

FIG. 21 illustrates yet another example of a multi-element condensing optical element. In this arrangement, an array of condensing elements 70 are optically attached onto an output surface 74 of a light-guiding plate 72. A light ray 78 from a source 76 enters an edge 80 of the light guiding plate, and is contained within the light-guiding plate 72 by the process of TIR, such as the TIR occurring at location 82. However, when light ray 78 is incident on the output surface 74 at the location of a condensing element, the light ray 78 will not TIR at the output surface 74 but will instead enter the condensing element. The light ray 78 will then either TIR at the surface of the outer section sidewall 24 or refract through lens 21 in a direction that is substantially parallel to the optical axis A-A, as described earlier.

Figure 22:
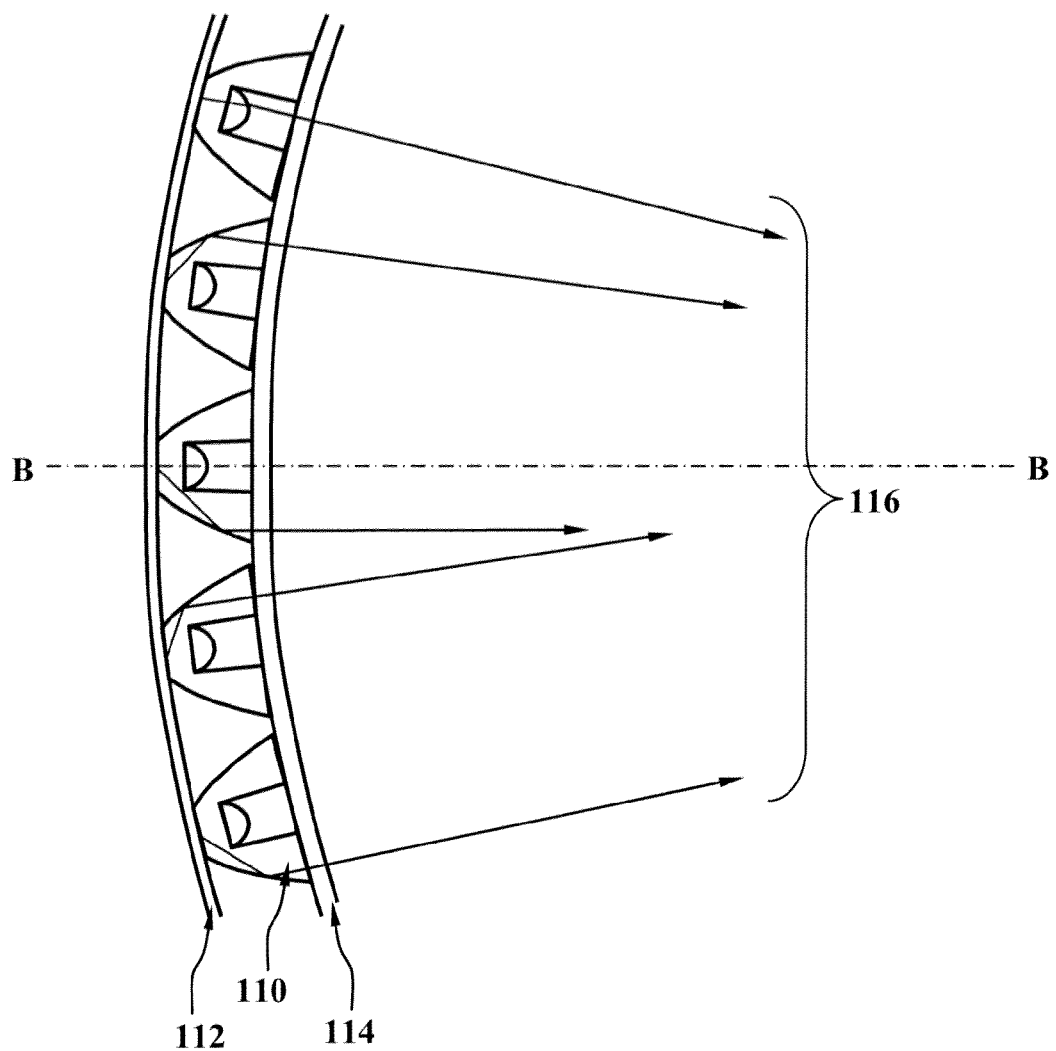
FIG. 22 is a cross-sectional view of a curved array of condensing elements in accordance with an exemplary embodiment of the present invention.

A further embodiment is illustrated in FIG. 22. In this multi-element configuration, an array of condensing elements 110 lie on a curved surface layer 112. An optional optically transparent curved cover 114 is provided to improve the mechanical robustness of the array. As opposed to the array shown in FIG. 20, which is substantially flat, the multi-element array described herein is curved about optical axis B-B which will allow for the light from the individual condensing elements to be placed where it is needed for a particular application. For example, for a flashlight or vehicular headlight application, the light rays 116 will be directed to a common focal location. Alternately, for general room lighting the light rays 116 will be directed in a widely diverging manner so that the entire room is illuminated evenly. Layer 112 and cover 114 can be flexible or non-rigid so the aggregate emission profile of the assembly can be varied and adjusted as needed.

Accordingly, the condensing element of the present invention can produce a substantially collimated light output, as well as non-collimated output as needed. Additionally, the condensing element as described herein is easy and inexpensive to produce with manufacturing procedures, such as injection molding. Further, the resulting condensing element has a compact design that is easy to use. Lastly, since the oblique and non-oblique light rays exiting the source are managed separately, and because no light is lost from a side of the optical element, there is no stray light, and consequently the efficiency is high.

Figure 23:
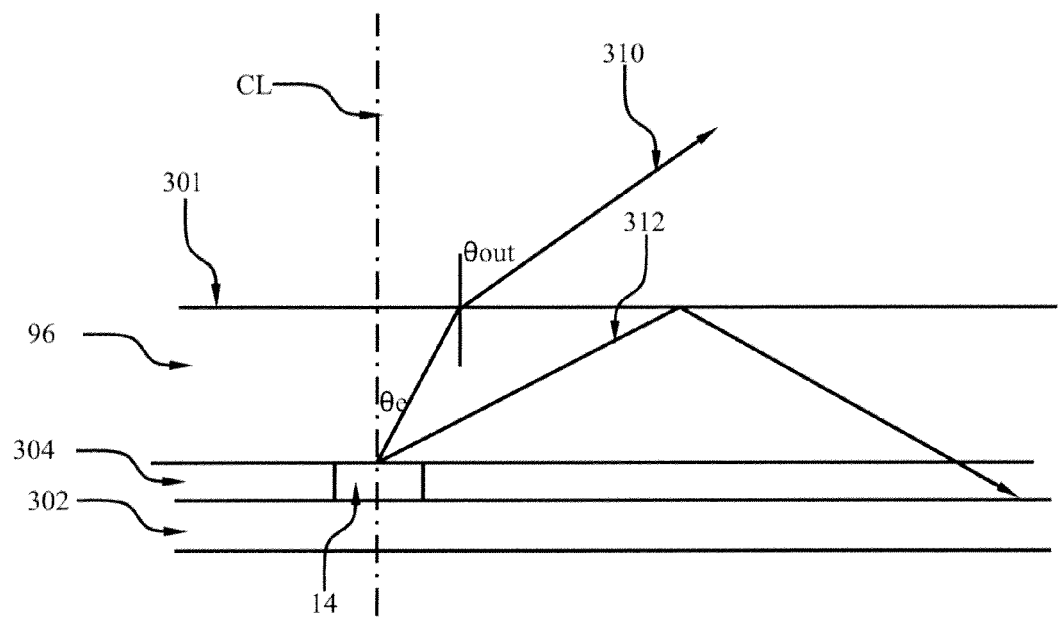
FIG. 23 is a cross-sectional view of a conventional LED die-based light source found in the prior art.

An additional benefit of the present invention is to improve the efficiency of the light source. Referring to FIG. 23, a cross-sectional view of a conventional LED die-based light source is shown. The LED die 14 is encapsulated under a substantially transparent layer 96 of polymer material, such as PET, which seals the LED die 14 from environmental contaminants yet allows the light emitted from the LED die 14 to propagate through it. An opposing side of the LED die 14 is coupled to an electrical conductor 302, which supplies power to the LED die 14, and also conducts heat away from the LED die 14 generated during operation. The electrical conductor 302 is generally opaque and substantially non-reflective to light rays. An adhesive 304 is placed alongside the LED die 14 to bond the electrical conductor 302, LED die 14, and the transparent layer 96 together, which are all in optical contact with one another.

In operation, when power is supplied to the LED die 14 by the electrical conductor 302, light rays are emitted by the LED die 14 into the transparent layer 96. One of these rays is a non-obliquely emitted ray 310, which is emitted by the LED die 14 into the transparent layer 96, at angle θe with respect to the center-line CL. Ray 310 propagates through the transparent layer 96 and exits into the surrounding medium, such as air, at angle θout in accordance with Snell's Law.

Another one of these rays in another non-obliquely emitted ray 312 which is emitted by the LED die 14 into the transparent layer 96 at an oblique angle. When the emitted ray 312 reaches surface 301 of the transparent layer 96, TIR occurs at the uppermost surface 301 of the transparent layer, and the ray 312 is reflected back on the substantially non-reflective conductor 302 where it is substantially absorbed. Accordingly, a portion of the rays that are emitted obliquely by the LED 14 are lost.

Figure 24:
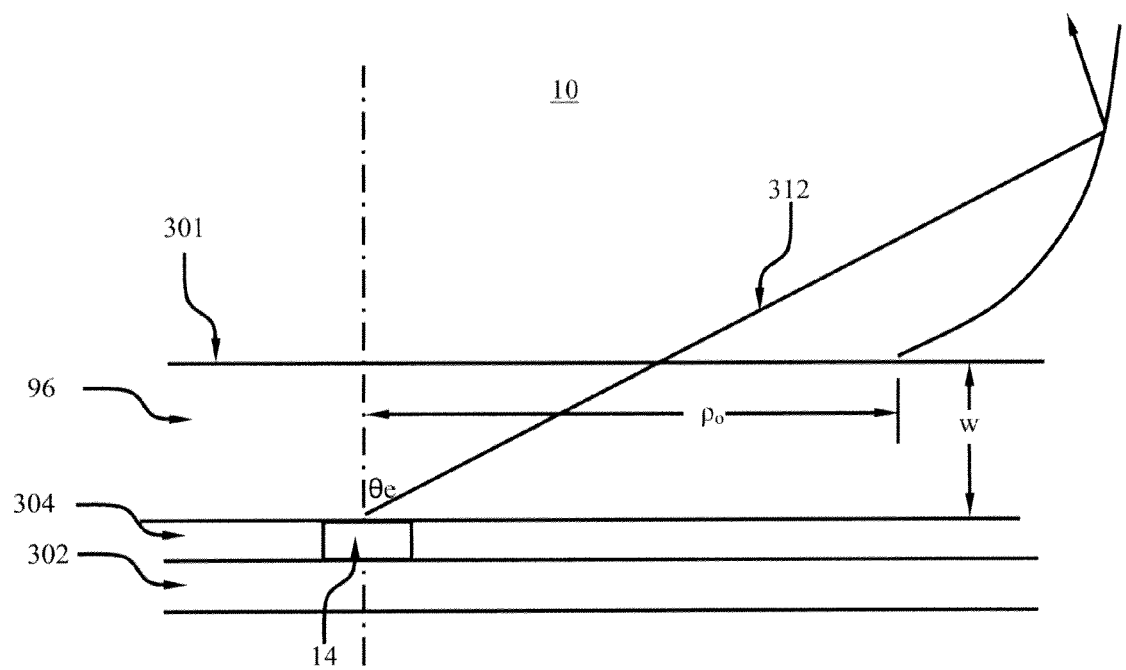
FIG. 24 is a partial cross-sectional view of a condensing element in accordance with an exemplary embodiment of the present invention.

Referring to FIG. 24, a partial, cross-sectional view of a TIRing condensing element in accordance with exemplary embodiments of the present invention coupled to an LED die-based light source along with an exemplary emitted light ray is illustrated. This figure illustrates how exemplary embodiments of the present invention can prevent oblique rays from being lost. In these embodiments, the LED die 14 also is encapsulated under a substantially transparent layer 96 of polymer material, such as PET, which seals the LED die 14 from environmental contaminants yet allows the light rays emitted from the LED die 14 to propagate through it, although other types and numbers of materials with other properties can be used. An opposing side of the LED die 14 is again coupled to an electrical conductor 302 which is used to supply power to the LED die 14 and also to conduct heat away from the LED die 14 generated during operation, although other manners for coupling power to the LED die 14 and for dissipating heat can be used. The electrical conductor 302 is generally opaque and substantially non-reflective to light, although other types of conductors with other properties can be used. An adhesive 304 is placed alongside the LED die 14 to bond the electrical conductor 302, LED die 14, and the transparent layer 96 together which are all in optical contact with one another, although other manners for optically coupling these elements together can be used. A base 22 of a TIRing condensing element 10, as previously illustrated and described herein, is installed on and is in optical contact with surface 301 of the transparent layer 96.

In operation, when the same ray 312 described earlier with reference to FIG. 23 is emitted by the LED die 14 into the transparent layer 96 at an oblique angle, there is no TIR of the ray 312 at the surface 301 of the transparent layer 96 below the condensing element 10. Instead, the ray 312 simply transmits through the surface 96 and into the TIRing condensing element 10. Once the ray 312 is in the TIRing condensing element 10, the ray 312 propagates in the manner previously illustrated and described herein. Accordingly, with the addition of the base 22 of TIRing condensing element 10 on the surface 301 of the transparent layer 96, more of the light rays emitted by the LED die 14 are collected by the TIRing condensing element 10 improving the overall extraction efficiency of the optical system. In these embodiments, extraction efficiency equals the total light passing through a transparent layer divided by the total light entering the transparent layer.

When ray 312 is emitted at an extremely oblique angle, such that it reaches surface 301 at a location beyond the base 22 of the TIRing condensing element 10, it will not propagate into the TIRing condensing element 10 but instead TIR at the surface 301, and reflect back onto the substantially non-reflective conductor 302 and be substantially absorbed. In other words, while the TIRing condensing element 10 does act to improve the efficiency of the system, it does not achieve a collection efficiency of 100% because some rays, the highly oblique rays, are still being lost.

By way of example only, a numerical example to illustrate a typical efficiency improvement with the base 22 of the TIRing condensing element 10 on the surface 301 of the transparent layer 96 will now be described. If the refractive index of the transparent layer 96 is 1.556, then its critical angle is 40.0°. To facilitate the calculations, a table of emissions, in percent, as a function of $\theta e$, in degrees, is presented in FIG. 25. The emissions are assumed to be Lambertian in nature, which follow a cosine-law drop-off with angle $\theta e$, and the amount of light emitted into angles above $\theta e$ in accordance with the cosine-law is presented in the "Source Emission Beyond $\theta e$" column. The light collection is also a function of solid-angle, whose calculations are presented in the "Solid Angle . . . " and "Hemisphere . . . " columns. The rightmost column, "% of Light Emitted Beyond $\theta e$" is the multiplication of the cosine-law column and "% of Hemisphere Beyond $\theta e$" column, and is the column of interest in computing collection efficiencies of the TIRing condensing element 10.

Again, assuming in this particular example, the critical angle is 40.0° then from the rightmost column of the table in FIG. 25, 27.36% of the light emitted by the LED die 14 lies outside the 40° critical angle, and will be TIR'ed. Accordingly, at this critical angle, 72.64% of the light will not be TIR'ed.

Next, if the base 22 of the condensing element 10 is now on the surface 301 of the transparent layer 96 and in this particular example the radius of the base 22, $\rho_o$, is 1.0 mm and the width w of the transparent layer 96 is 0.1 mm, the collection angle of the emitted light $\theta e$ is then $\tan^{-1}(1/0.1)=84.3°$. From the rightmost column of the table in FIG. 25, at 84°, only 0.06% of the light emitted from the LED die 14 will miss the base 22 and TIR at the uppermost surface 301 of the transparent layer 96. In other words, 99.94% of the light emitted by the LED die 14 into transparent layer 96 will be collected by the TIRing condensing element 10, which is a substantial improvement in efficiency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A condensing element comprising:
a bowl-shaped outer section having a sidewall between a light input surface at one end and a light output surface at the other end and providing substantially total internal reflection of light emitted from the input surface and incident upon the sidewall of the outer section; and
a lens-shaped inner section that is recessed within the outer section and having a sidewall extending to the output surface of the outer section; wherein light emitted from the light input surface is not directly incident upon the output surface and wherein the light input surface consists of a planar base of the outer section.

2. The element as set forth in claim 1, wherein light emitted from the input surface and passing through the inner section is not incident on the output surface.

3. The element as set forth in claim 1, further comprising a light source in optical communication with the input surface.

4. The element as set forth in claim 3, further comprising a film installed between the light source and the input surface.

5. The element as set forth in claim 3, further comprising an electrical conductor coupled to the light source to supply power to the light source.

6. The element as set forth in claim 1, wherein the inner section comprises a lens.

7. The element as set forth in claim 1, wherein the inner section comprises a Fresnel lens.

8. The element as set forth in claim 1, wherein the inner section comprises a TIRing Fresnel lens.

9. The element as set forth in claim 1, wherein the inner section comprises a conical shape.

10. The element as set forth in claim 1, wherein the inner section comprises a truncated cone.

11. The element as set forth in claim 10, wherein the truncated cone has a lens-shaped top.

12. The element as set forth in claim 1, wherein the inner section exhibits total internal reflection.

13. The element as set forth in claim 1, wherein the inner section comprises a peak that extends above the output surface.

14. The element as set forth in claim 1, wherein the inner section comprises a peak that is at the level of the output surface.

15. The element as set forth in claim 1, wherein the inner section comprises a peak that is below the output surface.

16. The element as set forth in claim 1, wherein the inner section comprises a prescription such that the half-power angle of the light exiting from the lens is less than about twenty degrees about the optical axis of the input light.

17. The element as set forth in claim 1, wherein the inner section comprises a prescription such that the half-power angle of the light exiting from the output surface is less than or equal to about twenty degrees about the optical axis of the input light.

18. The element as set forth in claim 1, wherein the light output surface is planar.

19. The element as set forth in claim 1, wherein the light output surface is textured.

20. The element as set forth in claim 1, wherein the light output surface is micro-structured.

21. The element as set forth in claim 1, wherein the light output surface comprises a diffractive optical element.

22. The element as set forth in claim 1, wherein the light output surface is curved.

23. The element as set forth in claim 1, wherein the outer section sidewall has a prescription such that the totally internally reflected light is reflected in a direction that is substantially parallel to the optical axis of the input light.

24. The element as set forth in claim 1, wherein the outer section and the inner section of the condensing element are integrally formed together.

25. The element as set forth in claim 1, further comprising a layer of material provided below the output surface which facilitates molding of the element.

26. The element as set forth in claim 1, further comprising multiple condensing elements arranged in an array.

27. The element as set forth in claim 26, wherein the array is planar.

28. The element as set forth in claim 26, wherein the configuration of the array is adjustable.

29. The element as set forth in claim 26, wherein the array is attached to a light output surface of a light-guide.

30. A method for making a condensing element, the method comprising:
forming a bowl-shaped outer section having a sidewall between a light input surface at one end and a light output surface at the other end and providing substantially total internal reflection of light emitted from the input surface and incident upon the sidewall of the outer section, wherein the light input surface consists of a planar base of the outer section; and
recessing within the outer section, a lens-shaped inner section having a sidewall extending to the output surface of the outer section, at a distance from the entering light that is within the focal position of the inner section, such that light emitted from the input surface is not directly incident upon the output surface.

31. The method as set forth in claim 30, further comprising providing a light source in optical communication with the input surface.

32. The method as set forth in claim 31, further comprising installing a film between the light source and the input surface.

33. The method as set forth in claim 31, further comprising providing an electrical conductor coupled to the light source to supply power to the light source.

34. The method as set forth in claim 30, wherein the inner section comprises a lens.

35. The method as set forth in claim 30, wherein the inner section comprises a Fresnel lens.

36. The method as set forth in claim 30, wherein the inner section comprises a TIRing fresnel lens.

37. The method as set forth in claim 30, wherein the inner section comprises a conical shape.

38. The method as set forth in claim 30, wherein the inner section comprises a truncated cone.

39. The method as set forth in claim 38, wherein the truncated cone has a lens-shaped top.

40. The method as set forth in claim 30, wherein the inner section exhibits total internal reflection.

41. The method as set forth in claim 30, wherein the inner section comprises a peak that extends above the output surface.

42. The method as set forth in claim 30, wherein the inner section comprises a peak that is at the level of the output surface.

43. The method as set forth in claim 30, wherein the inner section comprises a peak that is below the output surface.

44. The method as set forth in claim 30, wherein the inner section comprises a prescription such that the half-power angle of the light exiting from the lens is less than about twenty degrees about the optical axis of the input light.

45. The method as set forth in claim 30, wherein the inner section comprises a prescription such that the half-power angle of the light exiting from the output surface is less than or equal to about twenty degrees about the optical axis of the input light.

46. The method as set forth in claim 30, wherein the light output surface is planar.

47. The method as set forth in claim 30, wherein the light output surface is textured.

48. The method as set forth in claim 30, wherein the light output surface is micro-structured.

49. The method as set forth in claim 30, wherein the light output surface comprises a diffractive optical element.

50. The method as set forth in claim 30, wherein the light output surface is curved.

51. The method as set forth in claim 30, wherein the outer section sidewall has prescription such that the totally internally reflected light is reflected in a direction that is substantially parallel to the optical axis of the input light.

52. The method as set forth in claim 30, further comprising integrally forming together the outer section and the inner section of the condensing element.

53. The method as set forth in claim 30, further comprising providing a layer of material below the output surface which facilitates molding of the element.

54. The method as set forth in claim 30, further comprising arranging multiple condensing elements in an array.

55. The method as set forth in claim 54, wherein the array is planar.

56. The method as set forth in claim 54, wherein the configuration of the array is adjustable.

57. The method as set forth in claim 54, further comprising attaching the array to a light output surface of a light-guide.

58. The method as set forth in claim 30, wherein light emitted from the input surface and passing through the inner section is not incident on the output surface.

* * * * *